(12) United States Patent
Kim et al.

(10) Patent No.: US 10,771,680 B2
(45) Date of Patent: Sep. 8, 2020

(54) MOBILE TERMINAL AND CORRESPONDING CONTROL METHOD FOR CHANGING THE LENGTH OF A CONTROL ICON BASED ON A SIZE, POSITION AND/OR A MOVING SPEED OF A FIRST OBJECT IN A PREVIEW IMAGE

(71) Applicant: LG ELECTRONICS INC., Seoul (KR)

(72) Inventors: Seongeun Kim, Seoul (KR); Younghoon Song, Seoul (KR); Hyomin Eum, Seoul (KR); Jinseong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/323,386

(22) PCT Filed: Aug. 24, 2016

(86) PCT No.: PCT/KR2016/009383
§ 371 (c)(1),
(2) Date: Feb. 5, 2019

(87) PCT Pub. No.: WO2018/034376
PCT Pub. Date: Feb. 22, 2018

(65) Prior Publication Data
US 2020/0169660 A1  May 28, 2020

(30) Foreign Application Priority Data

Aug. 19, 2016 (KR) ........................ 10-2016-0105539

(51) Int. Cl.
*H04N 5/232* (2006.01)
*H04M 1/725* (2006.01)
(Continued)

(52) U.S. Cl.
CPC ....... *H04N 5/23216* (2013.01); *G06F 3/0485* (2013.01); *G06F 3/04817* (2013.01);
(Continued)

(58) Field of Classification Search
CPC .......... H04N 5/23216; H04N 5/232935; G06F 3/04817; G06F 3/0485; G06F 2203/04806;
(Continued)

(56) References Cited

U.S. PATENT DOCUMENTS

2008/0034316 A1* 2/2008 Thoresson .......... G06F 3/04855
715/781
2008/0178116 A1 7/2008 Kim
(Continued)

FOREIGN PATENT DOCUMENTS

JP          9-152856 A      6/1997
KR   10-2011-0128002 A    11/2011
(Continued)

*Primary Examiner* — Hung H Lam
(74) *Attorney, Agent, or Firm* — Birch, Stewart, Kolasch & Birch, LLP

(57) ABSTRACT

The present invention relates to a mobile terminal and a control method therefor and, more specifically, provides a mobile terminal comprising a camera, a sensing unit, a display unit, and a control unit, wherein the control unit outputs, on the display unit, a preview image captured through the camera in a state in which camera content is executed, the preview image includes at least one object, a control icon scrollable within a preset region is outputted on the display unit, the length of the control icon is a first length, and when the camera is focused on a first object included in the outputted preview image, at least one condition among size, outputted location, and speed of the first object is detected, and the length of the control icon is changed on the basis of the detected condition.

19 Claims, 15 Drawing Sheets

(a)

(b)

(51) Int. Cl.
*G06F 3/0485* (2013.01)
*G06F 3/0481* (2013.01)

(52) U.S. Cl.
CPC .. *H04M 1/72519* (2013.01); *H04N 5/232935* (2018.08); *G06F 2203/04806* (2013.01); *H04M 2201/38* (2013.01); *H04M 2250/52* (2013.01)

(58) Field of Classification Search
CPC ......... H04M 1/72519; H04M 2250/52; H04M 2201/38
See application file for complete search history.

(56) References Cited

U.S. PATENT DOCUMENTS

| | | | |
|---|---|---|---|
| 2009/0002516 A1* | 1/2009 | Suzuki | H04N 5/23212 348/223.1 |
| 2009/0109310 A1* | 4/2009 | Kobayashi | H04N 5/142 348/302 |
| 2010/0058227 A1 | 3/2010 | Danton et al. | |
| 2010/0173678 A1* | 7/2010 | Kim | H04N 5/23296 455/566 |
| 2011/0258577 A1* | 10/2011 | Steelberg | G06F 3/04855 715/786 |
| 2013/0194175 A1* | 8/2013 | Tarama | G06F 3/005 345/156 |

FOREIGN PATENT DOCUMENTS

| | | |
|---|---|---|
| KR | 10-2014-0098905 A | 8/2014 |
| KR | 10-1651470 B1 | 8/2016 |

\* cited by examiner (a)

(b)

MOBILE TERMINAL AND CORRESPONDING CONTROL METHOD FOR CHANGING THE LENGTH OF A CONTROL ICON BASED ON A SIZE, POSITION AND/OR A MOVING SPEED OF A FIRST OBJECT IN A PREVIEW IMAGE

CROSS REFERENCE TO RELATED APPLICATIONS

This application is the National Phase of PCT International Application No. PCT/KR2016/009383, filed on Aug. 24, 2016, which claims priority under 35 U.S.C. 119(a) to Patent Application No. 10-2016-0105539, filed in the Republic of Korea on Aug. 19, 2016, all of which are hereby expressly incorporated by reference into the present application.

TECHNICAL FIELD

The present disclosure relates to a mobile terminal and a control method thereof. More particularly, the present disclosure relates to a mobile terminal whose control icon length is changed based on at least one of a size of an object included in a preview image, the object output position, and the object movement speed, and a method for controlling the mobile terminal.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

As functions of the terminal are getting diversified, the terminal tends to be implemented as a multimedia player provided with complex functions such as photographing of photos or videos, playback of music or video files, game play, broadcast reception and the like for example.

Efforts are ongoing to support and increase the functionality of mobile terminals. Such efforts include software and hardware improvements, as well as changes and improvements in the structural components.

Furthermore, in recent years, taking pictures and moving pictures using the mobile terminal is not only universal, but also users want to use more specialized camera functions using the mobile terminal.

In this regard, a technique is needed that can control camera content of the mobile terminal using a control icon.

DISCLOSURE

Technical Purpose

The present disclosure aims at solving the above and other problems. A purpose of the present disclosure is to provide a mobile terminal and a control method thereof, in which while a preview image is output on camera content, and a scrollable control icon is output within a predetermined region, and the control icon length is changed based on at least one of a size of an object included in the preview image, the object output position, and the object movement speed, and a method for controlling the mobile terminal.

Technical Solution

In one aspect, there is provided a mobile terminal comprising: a camera; a sensing unit; a display; and a controller, wherein the controller is configured: to output a preview image taken by the camera on the display while camera content is being executed, wherein the preview image contains at least one object; to output a control icon on the display, wherein the control icon is scrollable within a pre-set region on the display, wherein a length of the control icon is a first length; to control the camera to focus on a first object contained in the output preview image; to obtain at least one of a size of the first object, a position of the first object, and a moving speed of the first object using the sensing unit; and to change the length of the control icon based on the obtained at least one.

In one embodiment, the controller is further configured: when the length of the control icon changes to be larger than the first length, to configure the control icon to scroll the pre-set region at a N-levels manner; and when the length of the control icon changes to be smaller than the first length, to configure the control icon to scroll the pre-set region at a M-levels manner, wherein M is greater than N.

In one embodiment, the controller is further configured: to obtain a first input signal indicating scrolling of the control icon from a first point to a second point of the pre-set region using the sensing unit; and to control the camera to zoom-in or zoom-out the taken preview image at a first speed in response to the first input signal, wherein the first speed is determined based on a distance from the first point to the second point.

In one embodiment, when the first input signal is maintained for a first time at the second point, the controller is further configured to control the camera to zoom-in or zoom-out the preview image for the first time.

In one embodiment, when the first input signal is removed from the second point, the controller is further configured to move the control icon to the first point, wherein the first point is a middle point of the pre-set region, wherein when the controller obtains a second input signal using the sensing unit, the controller is further configured to control the camera to capture the zoomed-in or zoomed-out preview image being output on the display.

In one embodiment, when the camera focuses on the first object, the controller is further configured to control the camera to output a focused region indicator on the camera content.

In one embodiment, the controller is further configured: when the size of the first object is larger than a pre-set size, to change the length of the control icon to be larger than the first length based on the size of the first object; and when the size of the first object is smaller than a pre-set size, to change the length of the control icon to be smaller than the first length based on the size of the first object.

In one embodiment, the controller is further configured: when a third input signal indicating scrolling of the control icon in a first direction is sensed by the sensing unit, to control the camera to increase a size of the focused region indicator; and when a fourth input signal indicating scrolling of the control icon in a second direction is sensed by the sensing unit, to control the camera to decrease a size of the focused region indicator, wherein the first and second directions are opposite to each other.

In one embodiment, when a focus assisting focus assisting function is activated by the camera content, the controller is further configured to overlay and output a focus assisting region on the preview image, wherein the focus assisting region contains the first object, wherein a size of the focus assisting region is determined based on a size of the first object.

In one embodiment, the controller is further configured: when the size of the focus assisting region is larger than a pre-set size, to change the length of the control icon to be larger than the first length based on the size of the focus assisting region; and when the size of the focus assisting region is smaller than a pre-set size, to change the length of the control icon to be smaller than the first length based on the size of the focus assisting region.

In one embodiment, the controller is further configured to control the camera content to output the focus assisting region to non-overlap with the first object on the preview image.

In one embodiment, when a focus peaking function is activated by the camera content, the controller is further configured to control the camera to output a focus peaking indicator on the first object.

In one embodiment, the controller is further configured: when sensing a fifth input signal indicting scrolling of the control icon in a third direction using the sensing unit, to adjust a thickness or the focus peaking indicator to be larger; and when sensing a sixth input signal indicting scrolling of the control icon in a fourth direction using the sensing unit, to adjust a thickness or the focus peaking indicator to be smaller.

In one embodiment, the fourth direction is the same as or opposite to the third direction.

In one embodiment, when the fourth direction is the same direction as the third direction, the sixth input signal indicates that the control icon is scrolled by a shorter distance than a scrolled distance indicated by the fifth input signal.

In one embodiment, the controller is further configured: when the obtained speed of the first object is higher than a pre-set speed, to change a length of the control icon to be smaller than the first length based on the speed of the first object; and when the obtained speed of the first object is lower than a pre-set speed, to change a length of the control icon to be larger than the first length based on the speed of the first object.

In one embodiment, the controller is further configured: when sensing a seventh input signal indicating scrolling of the control icon in a fifth direction using the sensing unit while a burst shot function of the camera content is activated, to control the camera to increase a number of image frames taken for a pre-set time by the camera; and when sensing an eighth input signal indicating scrolling of the control icon in a sixth direction using the sensing unit while a burst shot function of the camera content is activated, to control the camera to decrease a number of image frames taken for the pre-set time by the camera.

In one embodiment, the controller is further configured to control the camera to output, on the camera content, an indicator indicative of the number of image frames taken for the pre-set time.

In one embodiment, when the first object moves, the controller is further configured to control the camera to move a focus thereof based on the moving first object.

In another aspect, there is provided a method for controlling a mobile terminal, the method comprising: outputting a preview image taken by a camera on a display while camera content is being executed, wherein the preview image contains at least one object; outputting a control icon on the display, wherein the control icon is scrollable within a pre-set region on the display, wherein a length of the control icon is a first length; controlling the camera to focus on a first object contained in the output preview image; obtaining at least one of a size of the first object, a position of the first object, and a moving speed of the first object; and changing the length of the control icon based on the obtained at least one.

Technical Effect

The effect of the mobile terminal and the controlled method thereof according to the present disclosure is as follows.

According to at least one of embodiments of the present disclosure, a user may utilize various functions of the camera content using the control icon whose length is changed based on the size, output position, and moving speed of the object included in the preview image.

Further, according to at least one of embodiments of the present disclosure, while the user may use the control icon of the present disclosure, the user may solve the shaking problem occurring due to size enlargement/reduction of the moving pictures or images during the photographing or moving picture shooting.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTIONS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
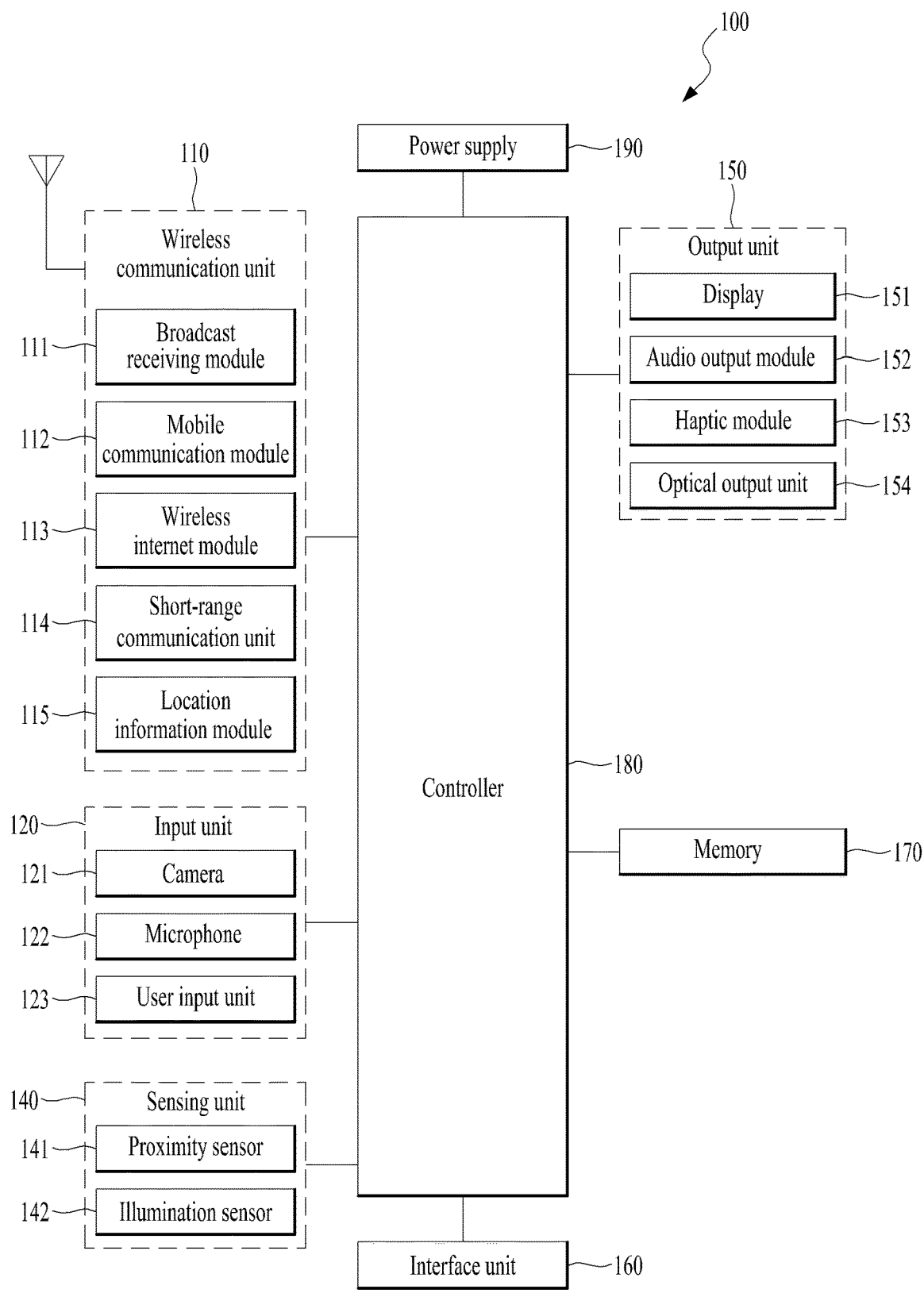
FIG. 1A is a block diagram of a mobile terminal in accordance with the present disclosure.
Figure 1B:
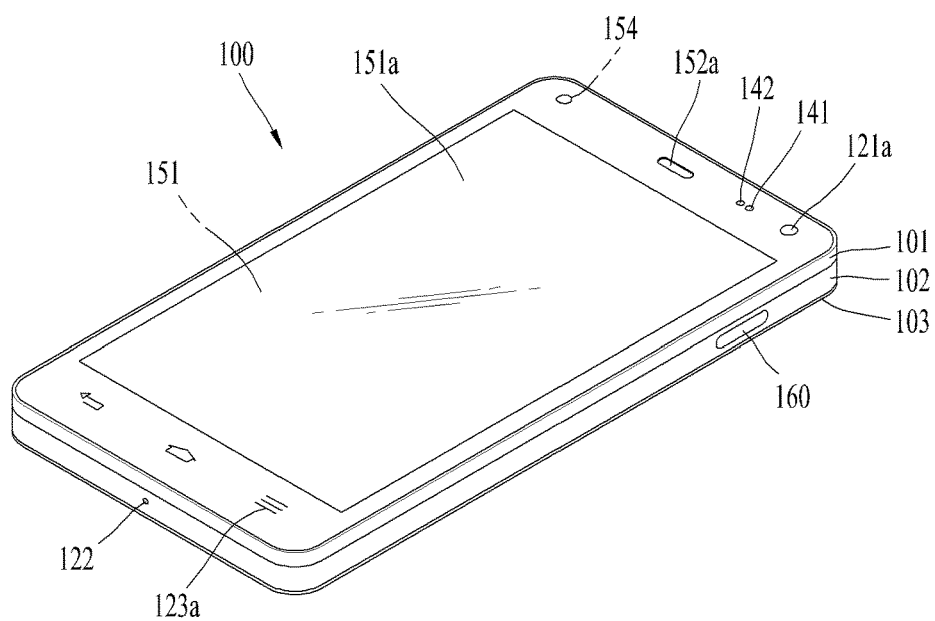
FIGS. 1B and 1C are conceptual views of one example of the mobile terminal, viewed from different directions.
Figure 1C:
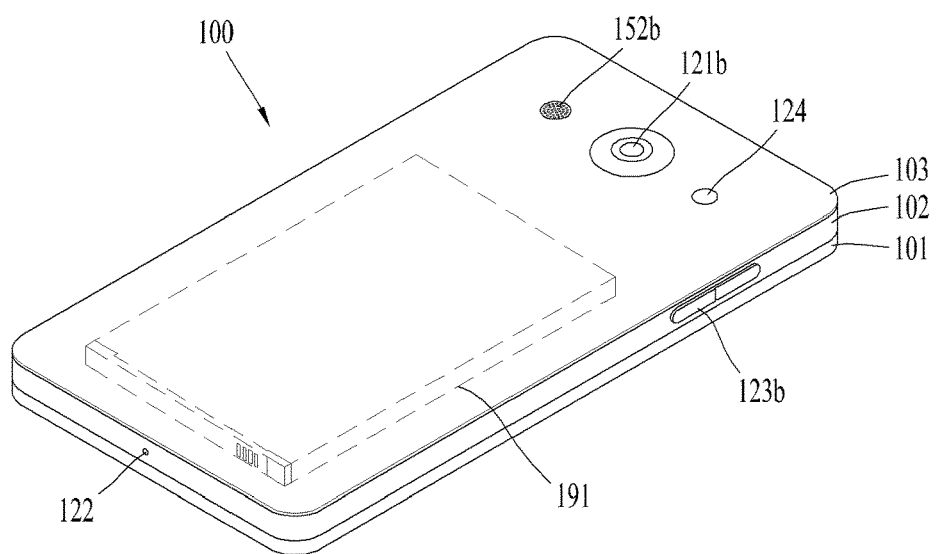

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described now with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display 151, the 1st audio output unit 152a, the 2nd audio output unit 152b, the proximity sensor 141, the illumination sensor 142, the optical output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
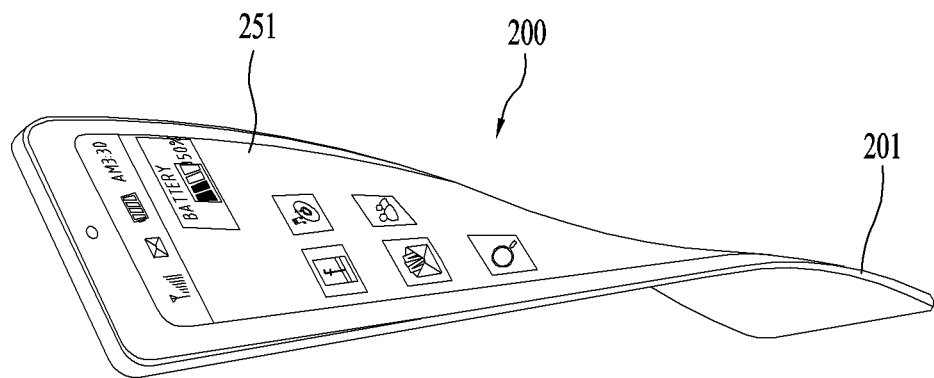
FIG. 2 is a conceptual diagram to describe another example of a deformable mobile terminal 200 according to the present disclosure.

FIG. 2 is a conceptual diagram to describe another example of a deformable mobile terminal 200 according to the present disclosure.

In this figure, mobile terminal 200 is shown having display unit 20, which is a type of display that is deformable by an external force. This deformation, which includes display unit 20 and other components of mobile terminal 200, may include any of curving, bending, folding, twisting, rolling, and combinations thereof. The deformable display unit 20 may also be referred to as a "flexible display unit." In some implementations, the flexible display unit 20 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 20 is not deformed (for example, in a state with an infinite radius of curvature and referred to as a first state), a display region of the flexible display unit 20 includes a generally flat surface. When in a state that the flexible display unit 20 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 20 may be a curved state (for example, a state of being curved from up to down or from right to left), instead of being in flat state. In this embodiment, when an external force is applied to the flexible display unit 20, the flexible display unit 20 may transition to the second state such that the flexible display unit is deformed into the flat state (or a less curved state) or into a more curved state.

If desired, the flexible display unit 20 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 20. The deformation sensor may be included in the sensing unit 140.

The deformation sensor may be located in the flexible display unit 20 or the case 201 to sense information related to the deforming of the flexible display unit 20. Examples of such information related to the deforming of the flexible display unit 20 may be a deformed direction, a deformed degree, a deformed position, a deformed amount of time, an acceleration that the deformed flexible display unit 20 is restored, and the like. Other possibilities include most any type of information which can be sensed in response to the curving of the flexible display unit or sensed while the flexible display unit 20 is transitioning into, or existing in, the first and second states.

In some embodiments, the controller 180 or other component can change information displayed on the flexible display unit 20, or generate a control signal for controlling a function of the mobile terminal 200, based on the information related to the deforming of the flexible display unit 20. Such information is typically sensed by the deformation sensor.

The mobile terminal 200 is shown having a case 10 for accommodating the flexible display unit 20. The case 10 can be deformable together with the flexible display unit 20, taking into account the characteristics of the flexible display unit 20.

A battery (not shown in this figure) located in the mobile terminal 200 may also be deformable in cooperation with the flexible display unit 20, taking into account the characteristic of the flexible display unit 20. One technique to implement such a battery is to use a stack and folding method of stacking battery cells.

The deformation of the flexible display unit 20 not limited to perform by an external force. For example, the flexible display unit 20 can be deformed into the second state from the first state by a user command, application command, or the like.

Meanwhile, beyond using a mobile terminal grabbed with a user's hand, the mobile terminal may extend to a wearable device that is wearable on a user body. Examples of the wearable device include a smart watch, a smart glass, a head mounted display (HMD), and the like. Examples of the mobile terminal extending to the wearable devices shall be described as follows.

A wearable device can exchange data with (or interwork with) another mobile terminal 100. The short-range communication module 114 can sense or recognize a nearby wearable device capable of communicating with the mobile terminal 100. Moreover, if the sensed wearable device is a device authenticated to communicate with the mobile terminal 100, the controller 180 may transmit at least one portion of the data processed in the mobile terminal 100 to the wearable device via the short-range communication module 114, for example. Hence, a user can use the data processed in the mobile terminal 100 through the wearable device. For example, when an incoming call is received by the mobile terminal 100, the user can answer the incoming call through the wearable device. When a message is received by the mobile terminal 100, the user can check the received message through the wearable device.

Figure 3:
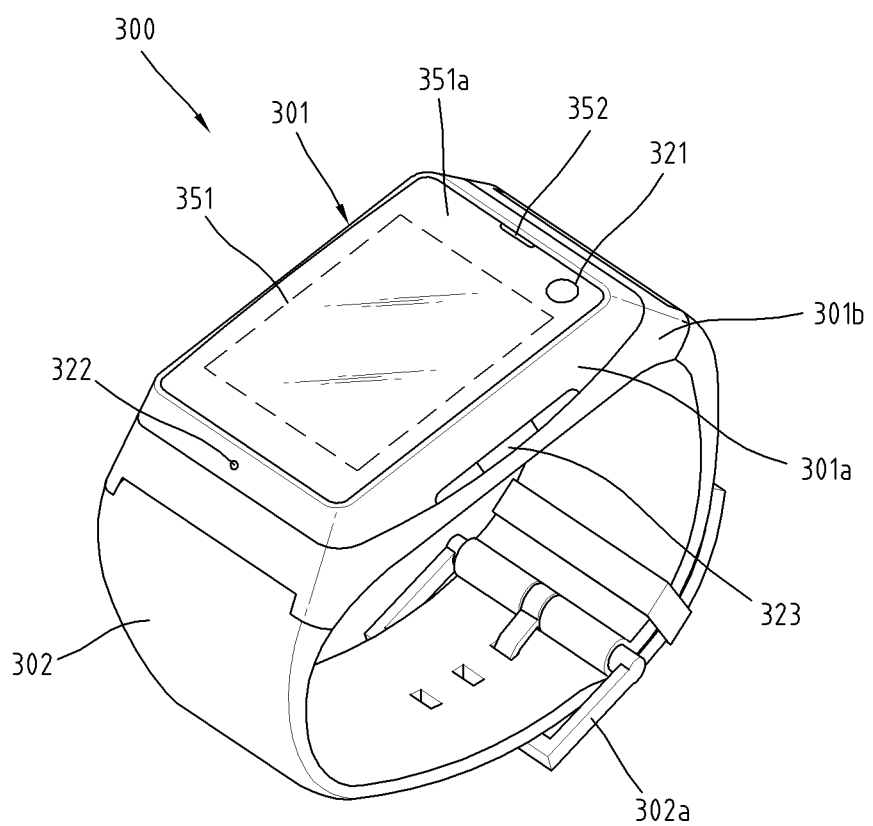
FIG. 3 is a perspective diagram for one example of a watch type mobile terminal 300 related to another embodiment of the present invention.

FIG. 3 is a perspective diagram for one example of a watch type mobile terminal 300 related to another embodiment of the present invention.

Referring to FIG. 3, a mobile terminal 300 of a watch type may include a main body 301 having a display unit 351 and a band 302 connected to the main body 301 to be wearable on a wrist. In general, the mobile terminal 300 may be configured to include features that are the same or similar to those of the former mobile terminal 100 shown in FIGS. 1A to 1C.

The main body 301 may include a case forming a certain appearance or exterior. As illustrated, the case may include a 1st case 301*a* and a 2nd case 301*b* configured to cooperatively provide an inner space for accommodating various electronic components therein, by which the present invention is non-limited. For instance, a single case is configured to provide the inner space, thereby embodying the mobile terminal 300 of a uni-body type.

The watch type mobile terminal 300 is configured to perform wireless communication, and an antenna for the wireless communication can be installed in the main body 301. It is able to expand performance of the antenna using the case. For example, a case containing a conductive material is electrically connected to the antenna to extend a ground region or a radiation region.

The display unit 351 is disposed on the front side of the main body 301 so as to output information. The display unit 351 is provided with a touch sensor so as to be embodied into a touchscreen. As illustrated, a window 351*a* of the display unit 251 is mounted on the 1st case 301*a* to form a front surface of the terminal body together with the 1st case 301*a*.

The main body 301 may be provided with an audio output unit 352, a camera 321, a microphone 322, a user input unit 323 and the like. In case that the display unit 351 is embodiment into the touchscreen, it can function as a user input unit 323. Hence, a separate key may not be provided to the main body 301.

The band 302 is configured to be worn on a wrist by enclosing the wrist. And, the band 302 may be formed of a flexible material for facilitating the wearing of the device. As one example, the band 302 may be made of leather, rubber, silicon, synthetic resin, and/or the like. As the band 302 is configured detachable from the main body 301, the band 302 may be substituted with various types of bands according to a user's preference.

Meanwhile, the band 302 may be used to expand the performance of the antenna. For example, a ground extending portion (not shown in the drawing) for extending a ground region by being electrically connected to the antenna may be built in the band 302.

The band 302 may include a fastener 302*a*. The fastener 302*a* may be embodied into a buckle type, a snap-fit hook structure, a Velcro® type, and/or the like. The fastener 302*a* may include a retractile section or material. According to the example shown in the present drawing, the fastener 302*a* is embodied into the buckle type.

Hereinafter, embodiments related to the control method that may be implemented by the mobile terminal as configured as described above will be described with reference to the accompanying drawings. It will be apparent to those skilled in the art that the present disclosure may be embodied in other specific forms without departing from the spirit or essential characteristics of the present disclosure.

Hereinafter, the mobile terminal as described later in FIGS. 4 to 14 may be implemented as one of the mobile terminals 100, 200, and 300 shown in FIGS. 1 to 3.

Hereinafter, embodiments of the present disclosure will be exemplified with reference to FIG. 4 to FIG. 14. In describing and understanding the embodiments of the present disclosure below, reference may be made to the foregoing with reference to FIGS. 1 to 3.

Figure 4:
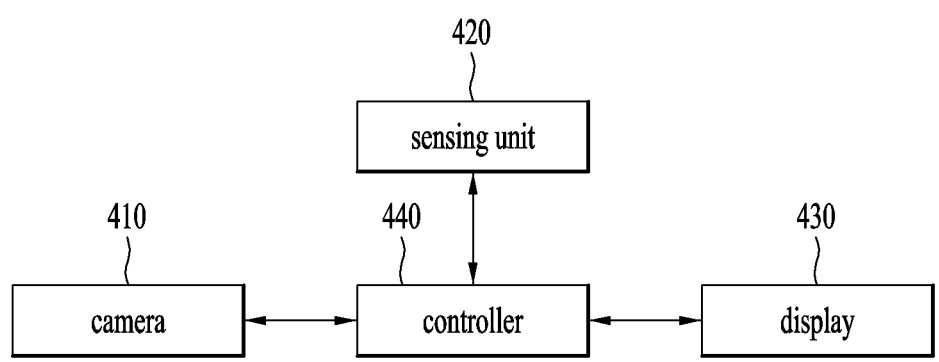
FIG. 4 is a block diagram illustrating a configuration module of a mobile terminal according to one embodiment of the present disclosure.

FIG. 4 is a block diagram illustrating a configuration module of a mobile terminal according to one embodiment of the present disclosure.

Referring to FIG. 4, a mobile terminal according to one embodiment of the present disclosure may include a camera 410, a sensing unit 420, a display 430, and a controller 440.

The camera 410 may process image frames such as still images or moving images obtained by an image sensor. The processed image frame may be output on the display 430 or stored in the mobile terminal. Further, the plurality of cameras 410 may be provided. The camera may be implemented in various structure such as a matrix structure, or a stereo structure, so that the mobile terminal may acquire a plurality of image frame information having various angles or foci.

In one embodiment of the present disclosure, the camera 410 may output a preview image as photographed on the display 430. Further, when the sensing unit senses the input signal indicating scrolling of the control icon, the camera 410 may zoom-in or zoom-out the taken preview image at preset rate. Further, when the sensing unit senses a touch input for selecting an object included in the preview image, the camera 410 may focus on the selected object. Further, in one embodiment of the present disclosure, when an auto focus is enabled on the camera content, the camera 410 may automatically focus on the object included in the preview image. This will be described in detail below.

The sensing unit 420 senses various inputs from the user to the mobile terminal and the environment of the mobile terminal. Then, the sensing unit may transmit the sensing result to the controller so that the controller 440 may perform various operations based on the sensing result. In the present disclosure, the sensing unit 420 may be implemented as a touch screen provided within the display 430. Alternatively, in the present disclosure, the sensing unit 420 may be implemented as the sensing unit 140 of FIG. 1*a*.

In one embodiment of the present disclosure, the sensing unit 420 may sense the size of an object included in the preview image output on the display 430 along with the camera 410, the position at which the object is output, and the speed at which the object moves. Further, the sensing unit 420 may sense a touch input signal indicating scrolling of the scrollable control icon within the pre-set region. This will be described in detail below.

The display 430 may also display visual information. In this connection, the visual information may include text, indicator, icon, content, application, image, and moving picture. Further, the display 430 may output the visual information to the screen based on the control command of the controller 440. Further, in the present disclosure, the display 430 may be implemented as the display 151 in FIG. 1*a* or the display 351 in FIG. 3*a*.

In one embodiment of the present disclosure, the display 430 may output the preview image that is captured via the camera 410. Further, display 430 may output the scrollable control icon within the pre-set region. Further, the display 430 may output a focused region indicator, a focus assisting region, a focus peaking indicator, and the like. This will be described in detail below.

The controller 440 processes the data, and controls each of the above units of the mobile terminal, and may control data transmission/reception between the units. In the present disclosure, the controller 440 may be implemented as the controller 180 in FIG. 1*a*.

In an example of the present disclosure, the operations performed by the mobile terminal may be controlled by the controller 440. However, for the sake of convenience, with reference to the drawings and the following examples, the operations may collectively be performed/controlled by the mobile terminal.

Control Icon

The mobile terminal may display the control icon on the camera content. In this connection, the control icon may be scrollable within the preset region, As the control icon moves away from a center position thereof, the mobile terminal may control the camera to quickly zoom in or out the preview image. Hereinafter, the control icon will be exemplified with reference to FIG. 5 to FIG. 7.

Figure 5:
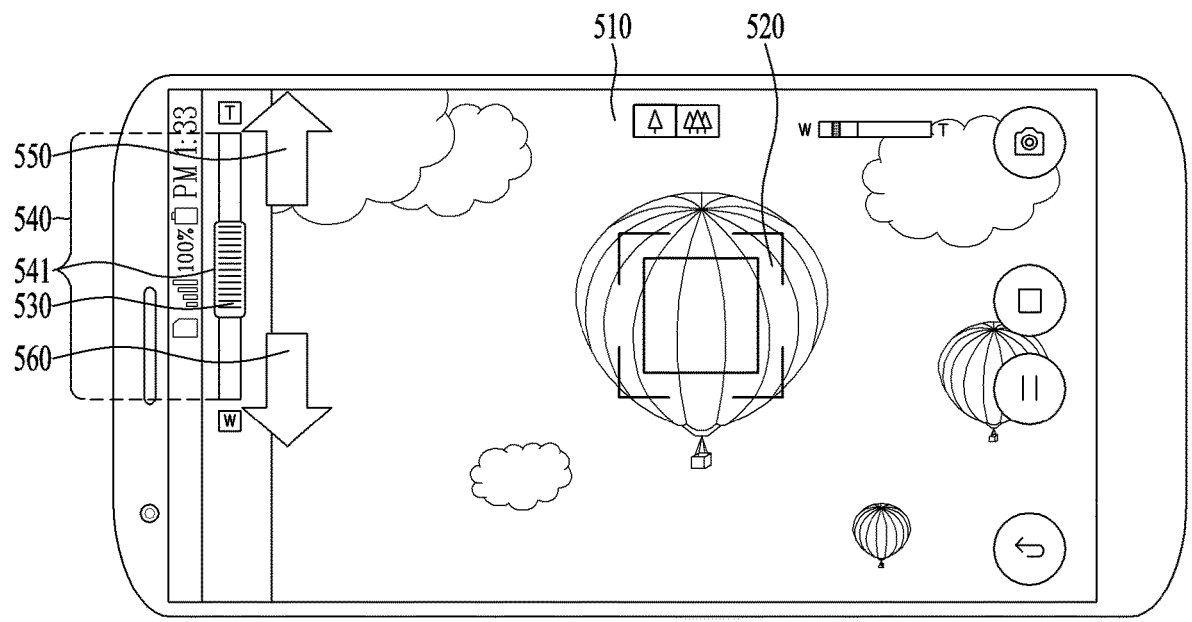
FIG. 5 is an illustration of a control icon according to one embodiment of the present disclosure.
Figure 5:
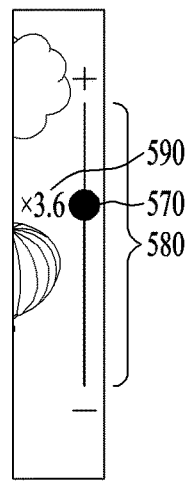

FIG. 5 is an illustration of the control icon according to one embodiment of the present disclosure. In the following, the overlapping descriptions with those in the example of FIG. 5 is omitted.

Referring to FIG. 5(*a*), the mobile terminal may output, on the display, the image frame being shot by the camera as the preview image 520 while the camera content 510 is being executed. In this connection, the camera content 510 may correspond to an application that images an image or a moving picture. In this connection, the preview image 520 may include at least one object. In this connection, an object may correspond to an object on which the camera may focus.

In one embodiment of the present disclosure, the mobile terminal may output the control icon 530 on the camera content 510. In this connection, one example of the control icon 530 may be a scrollable scroll bar within a preset region 540.

In one embodiment of the present disclosure, when the mobile terminal senses an input signal indicating scrolling of the control icon 530 in a first direction, e.g., upward direction 550, the controller may also control the camera to zoom-in the preview image 520 being shot. Similarly, when the mobile terminal senses an input signal indicating scrolling of the control icon 530 in a second direction, e.g., downward 560, the controller may control the camera to zoom-out the preview image 520 being shot.

However, in one embodiment of the present disclosure, the mobile terminal may adjust a speed of zooming-in or zooming-out the preview image based on a distance by which the control icon 530 scrolls from a middle point 541 of the pre-set region 540 to the first direction 550 or the second direction 560.

More specifically, when the mobile terminal senses the first input signal indicating scrolling of the control icon 530 from the first point to the second point in the first direction 550, the mobile terminal may zoom-in the preview image captured by the camera at the first speed. In this connection, the first speed may be determined based on the distance from the first point to the second point.

For example, when the first point is the middle point 541 of the scrolled pre-set region 540, and as the control icon 530 scrolls away from the first point to the first direction 550, the mobile terminal may more rapidly zoom-in the preview image being taken by the camera.

Similarly, when the mobile terminal senses a second input signal indicating scrolling of the control icon 530 from the first point to a third point in the second direction 560, the mobile terminal may zoom-out the preview image being taken by the camera at a second speed. For example, the first point is the middle point 541 of the pre-set region 540. In this case, the more the control icon 530 scrolls away from the first point to the second direction 560, the faster the mobile terminal may zoom-out the preview image.

That is, in one embodiment of the present disclosure, the mobile terminal may adjust the speed at which the camera zooms-in and zooms-out the preview image based on the distance by which the control icon 530 scrolls from the first point to the second point or the third point. That is, the longer the scrolling distance from the first point to the second point or the third point, the faster the camera will zoom-in or zoom-out the preview image.

Referring to FIG. 5(b), another illustration of the control icon 530 in FIG. 5(a) is illustrated. The mobile terminal may output a control icon 570 on the camera content 510. In this connection, the control icon 570 may illustrate a indicator scrollable within a pre-set region 580. Further, the mobile terminal may output the control icon 570, and at the same time, output the expansion or reduction magnification of the preview image using an indicator 590.

In the above description, the example in which the mobile terminal captures a still image was mainly provided by way of example. However, it goes without saying that the present disclosure may also be applied to a case of taking a moving picture.

Figure 6:
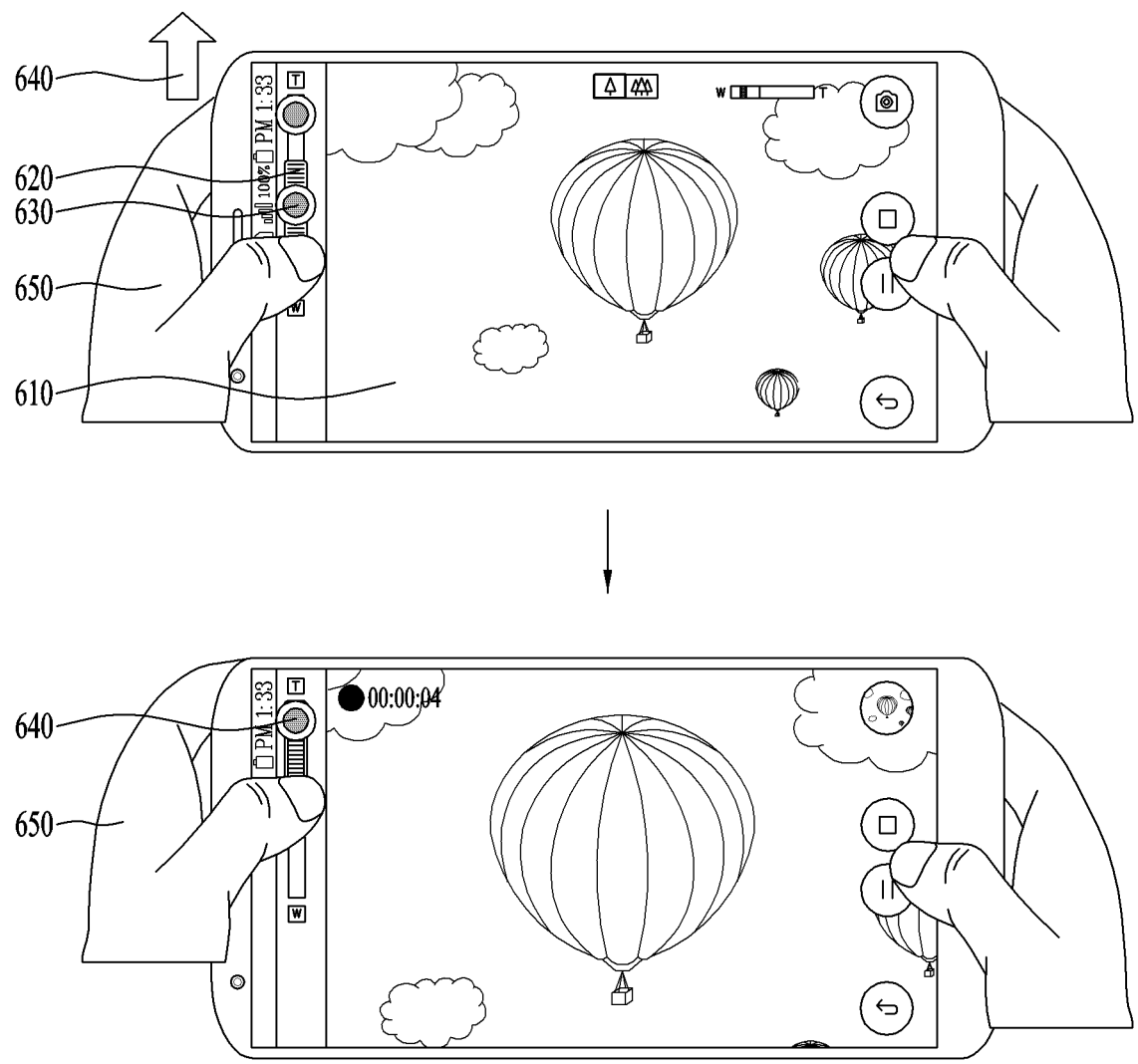
FIG. 6 is an illustration of an example of zooming-in the preview image while a position of the control icon is fixed according to one embodiment of the present disclosure.

FIG. 6 is an illustration of an embodiment of zooming-in the preview image while a position of the control icon is fixed according to one embodiment of the present disclosure. In a following, in the illustration of FIG. 6, overlapping descriptions with those of FIG. 4 and FIG. 5 are omitted.

Referring to a first drawing of FIG. 6, the mobile terminal may output a preview image 610 being shot via the camera on the display, while the camera content is being executed. Further, the mobile terminal may output a control icon 620 on the camera content.

In one embodiment of the present disclosure, the mobile terminal may sense a first input signal 650 scrolling the control icon 620 from a first point 630 to a second point 640 in the first direction. In this connection, the first point may correspond to a middle point of the pre-set region of the scrollable control icon 620.

In one embodiment of the present disclosure, the mobile terminal may zoom-in the preview image 610 that the camera is capturing as the terminal senses the first input signal 650.

Referring to a second drawing of FIG. 6, the mobile terminal control the camera to zooming-in the preview image 610 for a first time when the first input signal 650 is maintained at the second point 640 for the first time.

Further, FIG. 6 illustrates an example of zooming-in the preview image by scrolling the control icon 620 in the first direction. However, the same principle may be applied to an embodiment of scrolling the control icon 620 to the second direction to zoom-out the preview image.

That is, even though the first input signal 650 is not continuously scrolling the control icon 620, and when the first input signal 650 is touching the second point 640 for the first time, the mobile terminal may control the camera to zoom-in the preview image 610 being captured by the camera at the first speed mapped to the second point 640, for the first time. Further, in this connection, the first speed may be determined based on the embodiment of FIG. 5 described above.

Figure 7:
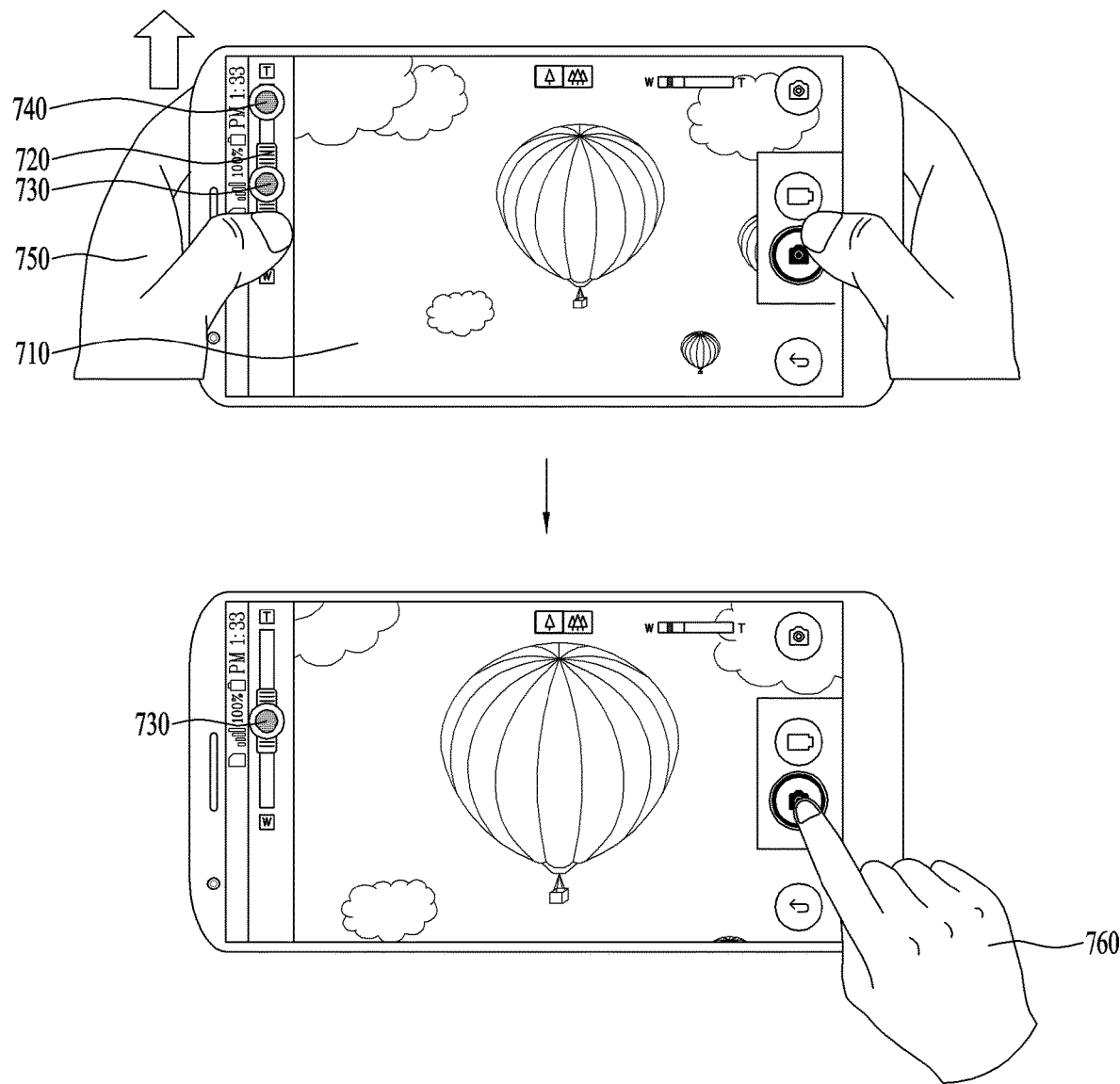
FIG. 7 is an illustration of an example of removing a touch with the control icon and maintaining an zoomed-in or zoomed-out state of a preview image according to one embodiment of the present disclosure.

FIG. 7 is an illustration of an embodiment of maintaining an zoomed-in or zoomed-out state of the preview image after touching the control icon according to one embodiment of the present disclosure. Hereinafter, in the description of the embodiment of FIG. 7, overlapping descriptions with those in FIG. 4 to FIG. 6 will be omitted.

Referring to a first drawing of FIG. 7, the mobile terminal may output a preview image 710 being shot through the camera on the display while the camera content is being executed. Further, the mobile terminal may output the control icon 720 on the camera content.

In one embodiment of the present disclosure, the mobile terminal may sense a first input signal 750 indicating scrolling of the control icon 720 from a first point 730 to a second point 740 in a first direction. In one embodiment of the present disclosure, the mobile terminal may zoom-in the preview image 710 being captured by the camera as the terminal senses the first input signal 750.

Referring to a second drawing of FIG. 7, when the first input signal 750 is removed from the second point 740, the control icon 720 may be moved to the first point 730. More specifically, when the input terminal 750 is removed from the second point 740 after the first input signal 750 is scrolled from the first point 730 to the second point 740, the control icon may move from the second point 740 to the first point 730 again. In this connection, the first point 730 may correspond to the middle point of control icon 720 in the scrolled pre-set region.

In one embodiment of the present disclosure, as the first input signal 750 is removed from the second point 740, and even when the control icon 720 is moved to the first point 730, the preview image 710 being output may remain zoomed-in according to the first input signal 750.

In one embodiment of the present disclosure, the mobile terminal may capture the preview image 710 being output as the terminal senses a second input signal 760. In this connection, the captured preview image 710 may correspond to the preview image 710 zoomed-in according to the first input signal 750.

Further, FIG. 7 illustrates an example of scrolling the control icon 720 in the first direction to zoom-in the preview image 710. The same principle may be equally applied to an embodiment of scrolling the control icon 720 in the second direction to zoom-out the preview image 710.

Control of Focused Region Indicator

When the mobile terminal focuses on a first object on the camera content, the mobile terminal may output a focused region indicator. That is, the mobile terminal may output a focused region indicator as a focused region indicator. In this connection, the terminal may control a size of the focused region indicator using the control icon. The mobile terminal may change a length of the control icon based on a size of the first object. Hereinafter, referring to FIG. 8 to FIG. 11, the focused region indicator being controlled by the control icon is illustrated.

Figure 8:
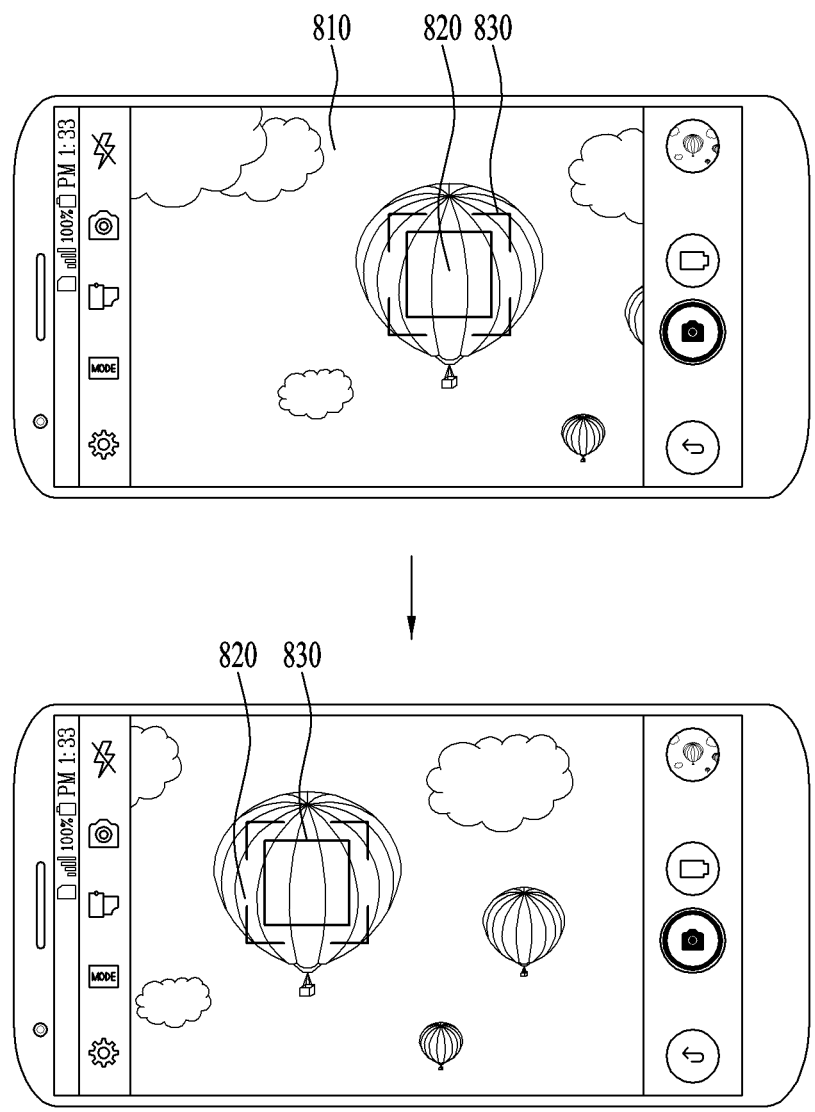
FIG. 8 is an illustration of an example in which a focus moves according to one embodiment of the present disclosure.

FIG. 8 is an illustration of an example in which a focus moves according to one embodiment of the present disclosure. Hereinafter, in a description of the embodiment of FIG. 8, the overlapping descriptions as those as FIG. 4 to FIG. 7 will be omitted.

Referring to a first drawing of FIG. 8, the mobile terminal may output a preview image 810 being shot through the camera on the display while the camera content is being executed. In this connection, the preview image 810 may include a first object 820.

In one embodiment of the present disclosure, when the mobile terminal senses a touch input that selects the first object 820 included on the preview image 810, or, when the auto focus function is enabled, the terminal may control the camera to focus on the first object 820. Further, when the camera focuses on the first object 820, the mobile terminal may overlay the focused region indicator 830 on the first object 820 and output the same. In this connection, the focused region indicator 830 may correspond to an indicator for indicating, to the user, a focused region by the camera.

In one embodiment of the present disclosure, when a tracking auto focus (TAF) function of the camera content is enabled, the mobile terminal may control the camera to focus on a moving object.

Referring to a second drawing of FIG. 8, when the first object 820 moves, the mobile terminal may control the camera to move the focus thereof to focus on the moving first object 820. In one embodiment of the present disclosure, when the camera moves the focus to focus on the first object 820 being moved, the mobile terminal may move and output the focused region indicator 830 correspondingly.

Accordingly, the user may take a clear picture without losing a focus when shooting moving objects, animals, or people using the mobile terminal of the present disclosure.

Figure 9:
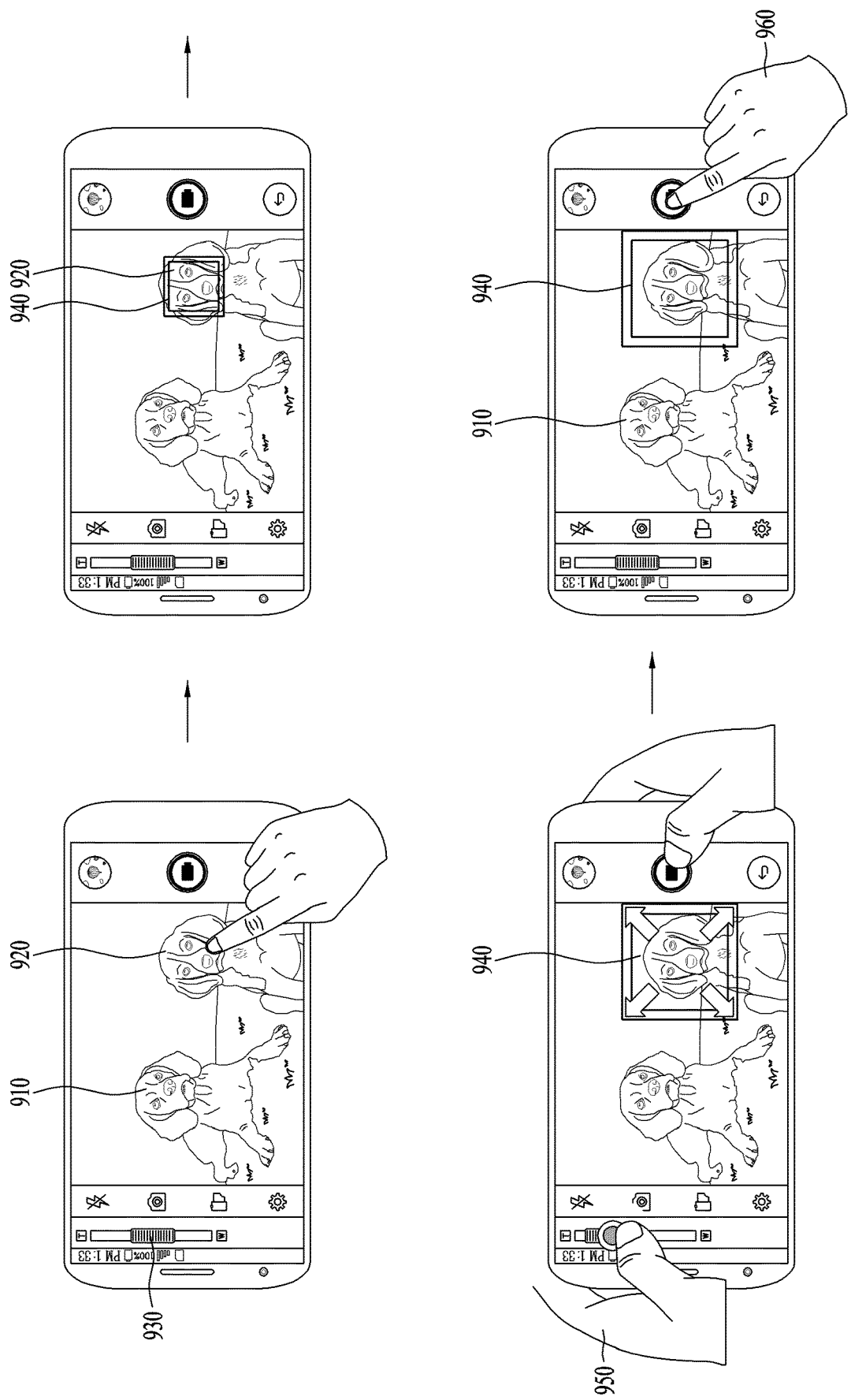
FIG. 9 is an illustration of an example in which the size of the focused region indicator is controlled according to one embodiment of the present disclosure.

FIG. 9 is an illustration of an example in which a size of the focused region indicator is controlled according to one embodiment of the present disclosure. Hereinafter, in the description of FIG. 9, the description overlapping with those in FIG. 4 to FIG. 8 is omitted. It is needless to say that the embodiment of FIG. 9 may be applied when the tracking auto focus (TAF) function is activated by applying the embodiment of FIG. 8.

Referring to a first drawing of FIG. 9, the mobile terminal may output a preview image 910 including a first object 920 on the display while the camera content is executed. Further, the mobile terminal may output a control icon 930 on the camera content.

In one embodiment of the present disclosure, the mobile terminal may control the camera to focus on the first object 920 when the terminal is sensing a touch input that selects the first object 920. Further, the mobile terminal may control the camera to focus on the first object 920 in a different manner.

Referring to a second drawing of FIG. 9, when the camera focuses on the first object 920, the mobile terminal may overlay and output a focused region indicator 940 with the first object 920. In one embodiment of the present disclosure, when the first object 920 moves, the mobile terminal may control the camera to move the focus to focus on the moving first object 920. The focused region indicator 940 may be moved while being output.

Referring to a third drawing of FIG. 9, when the mobile terminal may sense a first input signal 950 scrolling the control icon 930 from a first point to a first direction, for example, the up direction. Thus, when the mobile terminal senses the first input signal 950, the terminal may control the camera to focus on the first object 920 in an enlarged state. In this connection, the first point may correspond to the middle point of the scrolled pre-set region of the control icon 920.

In one embodiment of the present disclosure, the mobile terminal may increase the size of the focused region indicator 940 as the terminal senses the first input signal 950. More specifically, as the control icon 930 scrolls away from the middle point in the first direction, the mobile terminal may gradually increase the size of the focused region indicator 940 being output. Similarly, as the control icon 930 scrolls away from the middle point in the first direction, the mobile terminal may control the camera to focus on the first object 920 in an enlarged state.

In one embodiment of the present disclosure, the mobile terminal may decrease the size of the focused region indicator 940 as the terminal senses a second input signal indicating scrolling of the icon in the second direction. More specifically, as the control icon 930 scrolls away from the middle point in the second direction, the mobile terminal may gradually decrease the size of the focused region indicator 940 being output. Similarly, as the control icon 930 scrolls away from the middle point in the second direction, the mobile terminal may control the camera to focus on the first object 920 in a zoomed-out state.

Referring to a fourth drawing of FIG. 9, the mobile terminal may sense a third input signal 960 indicating capturing of the preview image 910 while the focused region indicator 940 is being output. More specifically, while the mobile terminal controls the camera to focus on the first object 920 in an zoomed-in state according to the above-described embodiment, the terminal may sense the third input signal 960. Thus, the terminal may control the camera to capture a target object of the preview image 910 or take a moving picture.

That is, according to one embodiment of the present disclosure, the user may control the size of the moving focus region by controlling the control icon.

Figure 10:
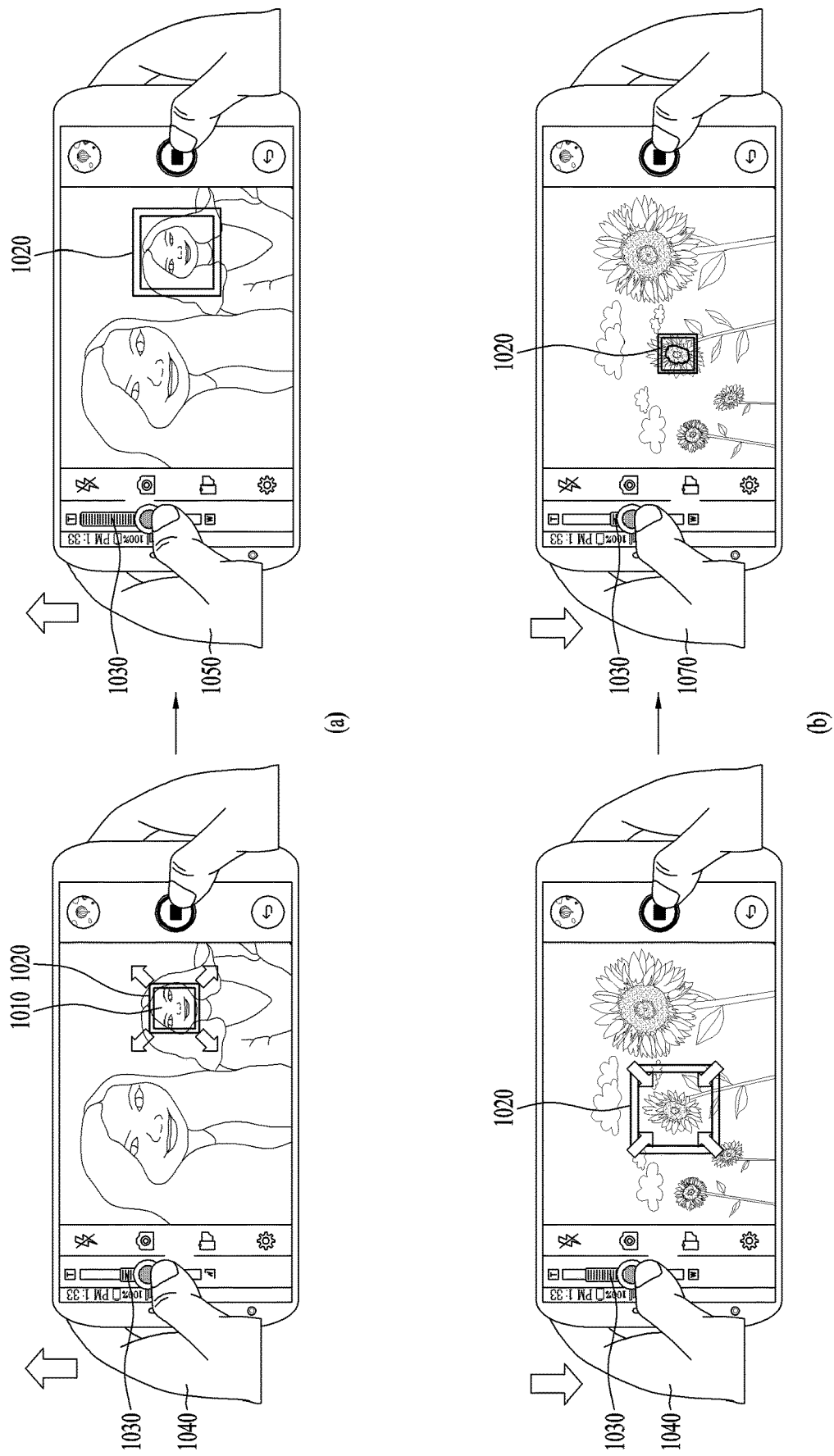
FIG. 10 is an illustration of an example in which the length of the control icon is changed according to the size of the object according to one embodiment of the present disclosure.

FIG. 10 is an example of changing a length of the control icon according to a size of the object according to one embodiment of the present disclosure. Hereinafter, in description of the FIG. 10, overlapping description with those in FIG. 4 to FIG. 9 will be omitted.

Each of first drawings of FIGS. 10(a) and 10(b) assumes that a focused region indicator 1020 has been overlaid and output on a first object 1010 according to the embodiment of FIG. 9.

Referring to the first drawing of FIG. 10(a), the mobile terminal may sense a first input signal 1040 scrolling the control icon 1030 in the first direction. In this connection, a length of control icon 1030 may correspond to a first length set to be a default length. In one embodiment of the present disclosure, the mobile terminal may significantly change the size of the focused region indicator 1020 as the terminal senses the first input signal 1040.

Unlike FIG. 9, in one embodiment of the present disclosure, when the size of the focused first object 1010 is greater than a pre-set size, the length of the control icon 1030 may be changed based on the size of the first object 1010.

More specifically, as the mobile terminal significantly changes the size of the focused region indicator 1020, (i.e., when the camera focuses on the first object 1010 in an zoomed-in state), the length of the control icon 1030 may change to be longer than the first length.

Referring to a second drawing of FIG. 10(*a*), the mobile terminal may change the size of the focused region indicator 1020 being output, when the mobile terminal senses a second input signal 1050 scrolling the control icon 1030 having a longer length to the first direction.

In one embodiment of the present disclosure, when the mobile terminal significantly changes the size of the focused region indicator 1020 according to the second input signal 1050, the size of the focused region indicator 1020 may not be changed so much as to exceed the angle of view region. Further, in another embodiment, when the mobile terminal significantly changes the size of the focused region indicator 1020 according to the second input signal 1050, the mobile terminal changes the size of the focused region indicator not to exceed a specified ratio of the entire display region (for example, ¼ of the entire display region).

In one embodiment of the present disclosure, when the length of the control icon 1030 is a first length, the scrolled pre-set region for the control icon 1030 may be scrolled in a N-levels (or steps) manner. That is, the pre-set region for the control icon 1030 may be divided in a N-levels manner so that the control icon 1030 may be stepwisely scrolled along the pre-set region in a N-levels manner. More specifically, when the scrolled pre-set region for the control icon 1030 may be scrolled in a N-levels manner, the mobile terminal may control the size of the focused region indicator 1020 in a N-levels manner. For example, when the length of control icon 1030 is the first length, the scrolled pre-set region for the control icon 1030 may be scrolled in a 5-levels manner. Accordingly, as the mobile terminal senses an input signal indicating scrolling of the control icon 1030, the size of the focused region indicator 1020 may be changed in a 5-levels manner.

In one embodiment of the present disclosure, when the length of the control icon 1030 is changed to be larger than the first length, the scrolled pre-set region for the control icon 1030 may be scrolled in a M-levels (steps) manner. That is, the pre-set region for the control icon 1030 may be divided in a M-levels manner so that the control icon 1030 may be stepwisely scrolled along the pre-set region in a M-levels manner. In this connection, the M is smaller than N. In one example, when the length of the control icon 1030 is changed to be larger than the first length, the scrolled pre-set region for the control icon 1030 may be scrolled in a 3-levels manner. Accordingly, as the mobile terminal senses an input signal indicating scrolling of the control icon 1030, the size of the focused region indicator 1020 may be changed in a 3-levels manner.

That is, as the length of the control icon 1030 increases, the scrolled pre-set region for the control icon 1030 may be scrolled in a smaller number of levels manner. That is, as the length of the control icon 1030 increases, the mobile terminal may subdivide the scrolled pre-set region into the smaller number of sub-regions. This may limit an extent to which the size of the focused region indicator 1020 may change.

Referring to a first drawing of FIG. 10(*b*), the mobile terminal may sense a third input signal 1060 indicating scrolling of the control icon 1030 in the second direction. At this time, the length of control icon 1030 may correspond to the first length as the default length. In one embodiment of the present disclosure, the mobile terminal may decrease the size of the focused region indicator 1020 as the terminal senses the third input signal 1060.

Unlike FIG. 9, in one embodiment of the present disclosure, when the size of the focused first object 1010 is smaller than the preset size, the mobile terminal may decrease the length of the control icon 1030 based on the size of the first object 1010.

More specifically, as the mobile terminal may change the length of the control icon 1030 to be shorter, (i.e., when the camera focuses on the first object 1010 in a zoomed-out state thereof), the terminal may change the length of the focused region indicator 1020 to be smaller than the first length.

Referring to a second drawing of FIG. 10(*b*), as the mobile terminal senses a fourth input signal 1070 scrolling the control icon 1030 of the shortened length in the first direction, the mobile terminal may change the size of the focused region indicator 1020 to be smaller.

In one embodiment of the present disclosure, when the mobile terminal changes the size of the focused region indicator 1020 to a smaller value according to the fourth input signal 1070, the mobile terminal may not change the size of the focused region indicator 1020 to be smaller than a minimum contour on the first object 1020 by which the size of the focused region indicator 1020 is recognized. Further, in another embodiment, when the mobile terminal changes the size of the focused region indicator 1020 to a smaller value according to the fourth input signal 1070, the mobile terminal may not change the size of the focused region indicator 1020 to be below a specified ratio (for example, a 1/150 ratio) of the entire display area.

In one embodiment of the present disclosure, when the length of the control icon 1030 is a first length, the scrolled pre-set region for the control icon 1030 may be scrolled in a N-levels manner. For example, when the length of control icon 1030 is the first length, the scrolled pre-set region for the control icon 1030 may be scrolled in a 5-levels manner.

In one embodiment of the present disclosure, when the length of the control icon 1030 is changed to be larger than the first length, the scrolled pre-set region for the control icon 1030 may be scrolled in a Z-levels manner. In this connection, the N is smaller than Z. In one example, when the length of the control icon 1030 is changed to be larger than the first length, the scrolled pre-set region for the control icon 1030 may be scrolled in a 7-levels manner. Accordingly, as the mobile terminal senses an input signal indicating scrolling of the control icon 1030, the size of the focused region indicator 1020 may be changed in a 7-levels manner.

That is, as the length of the control icon 1030 decreases, the scrolled pre-set region for the control icon 1030 may be scrolled in a larger number of levels manner. That is, as the length of the control icon 1030 decreases, the mobile terminal may subdivide the scrolled pre-set region into the larger number of sub-regions. This may increase an extent to which the size of the focused region indicator 1020 may change.

Figure 11:
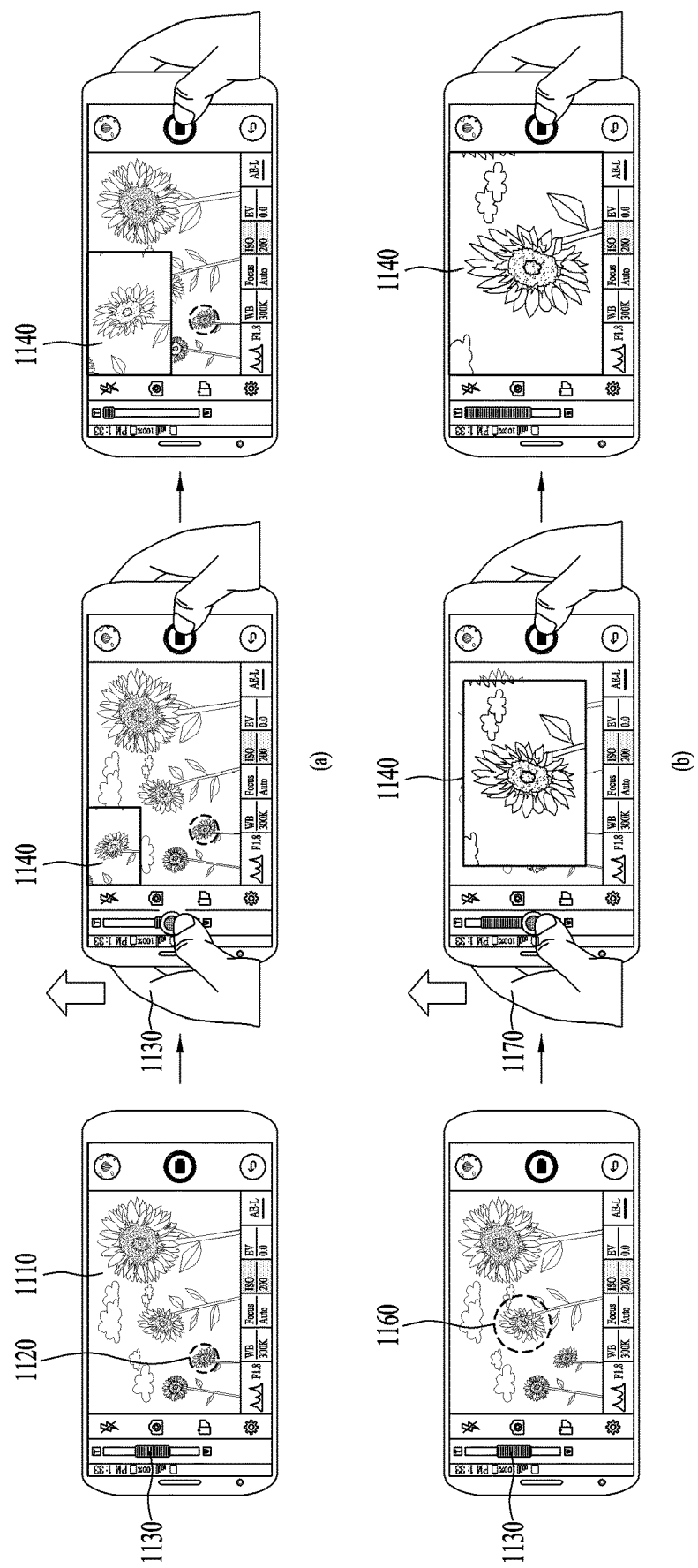
FIG. 11 is an illustration of an example for controlling a size of a focus assisting region according to one embodiment of the present disclosure.

FIG. 11 is an illustration of an example for controlling a size of a focus assisting region according to one embodiment of the present disclosure. Hereinafter, in the description of the embodiment of FIG. 11, the overlapping description with those in FIG. 4 to FIG. 10 will be omitted.

Referring to a first drawing of FIG. 11(*a*), the mobile terminal may output a preview image 1110 including a first object 1120 on the display while the camera content is being executed. In this connection, the mobile terminal may detect the size of the first object 1120. Further, the mobile terminal may output a control icon 1130 on the camera content. In one embodiment of the present disclosure, the mobile terminal may control the camera to focus on the first object 1120.

Hereinafter, in the embodiment of FIG. 11(a), it is assumed that the size of the first object 1120 is smaller than the pre-set size.

Referring to a second drawing of FIG. 11(a), when the focus assisting function of the camera content is activated, a focus assisting region 1140 including the focused first object 1120 may be overlaid on the preview image. In this connection, the focus assisting region 1140 may correspond to a region containing an image including the focused first object 1120.

In one embodiment of the present disclosure, the mobile terminal may control the location of the focus assisting region 1140 not to be overlaid with a location of the first object 1120 included in the preview image 1110. In this connection, a default size of the focus assisting region 1140 may be determined based on a size of the first object 1120.

In one embodiment of the present disclosure, when the size of the focus assisting region 1140 is smaller than the pre-set size, the length of the control icon 1130 may be changed to smaller than the first length based on the size of the focus assisting region 1140.

Referring to a third drawing of FIG. 11(a), the mobile terminal may increase the size of the focusing assist region 1140 when sensing the first input signal 1150 scrolling the control icon 1130 having the shortened length in the first direction.

That is, when the length of the control icon 1130 is smaller in the embodiment of FIG. 11(a), a number of levels at which the control icon 1130 may be scrolled becomes larger. Thus, a number of levels at which the mobile terminal may change the size of the focusing assist region 1140 increases.

Referring to a first drawing of FIG. 11(b), the mobile terminal may output a preview image that includes a second object 1160 on the display while the camera content is being executed. In this connection, the mobile terminal may detect a size of the second object 1160. Further, the mobile terminal may output a control icon 1130 on the camera content. In one embodiment of the present disclosure, the mobile terminal may control the camera to focus on the first object 1160. Hereinafter, in the embodiment of FIG. 11(b), it is assumed that the size of the second object 1160 is larger than the pre-set size.

Referring to a second drawing of FIG. 11(b), when the focus assisting function of the camera content is activated, the mobile terminal may overlay the focus assisting region 1140 including the focused second object 1160 on the preview image. In this connection, the focus assisting region 1140 may correspond to a region outputting an image including the focused second object 1160.

In one embodiment of the present disclosure, a default size of the focus assisting region 1140 may be determined based on the size of the second object 1160. In this connection, when the focus assisting region 1140 is larger than the pre-set size, the mobile terminal may overlay the focus assisting region 1140 on a central region of the preview image.

In one embodiment of the present disclosure, when the size of the focus assisting region 1140 is greater than the pre-set size, the length of the control icon 1130 may be changed to be larger than the first length based on the size of the focus assisting region 1140.

Referring to a third drawing of FIG. 11(b), when the mobile terminal senses a second input signal 1170 scrolling the control icon 1130 having a larger length in the first direction, the terminal may increase the size of the focusing assist region 1140 being outputted.

That is, when the length of the control icon 1130 becomes larger in the embodiment of FIG. 11(b), the number of levels at which the control icon 1130 may be scrolled becomes decreased, and, thus, the number of levels at which the mobile terminal may significantly change the size of the focusing assist region 1140 decreases.

That is, when the embodiment of FIG. 10 may be applied to the embodiment of FIG. 11, the scrolled pre-set region may be subdivided based on the length of the control icon 1130. Thus, a number of levels at which the focus assisting region 1140 may change may be adjusted.

Focus Peaking

The user may use a focus peaking function when a manual focus function of the mobile terminal is activated. The focus peaking function refers to a camera function that allows different colors on the preview image to be rendered in pixels to distinguish a focused region from a non-focused region. Hereinafter, referring to FIG. 12 and FIG. 13, an embodiment for controlling the focus peaking function using the control icon will be described.

Figure 12:
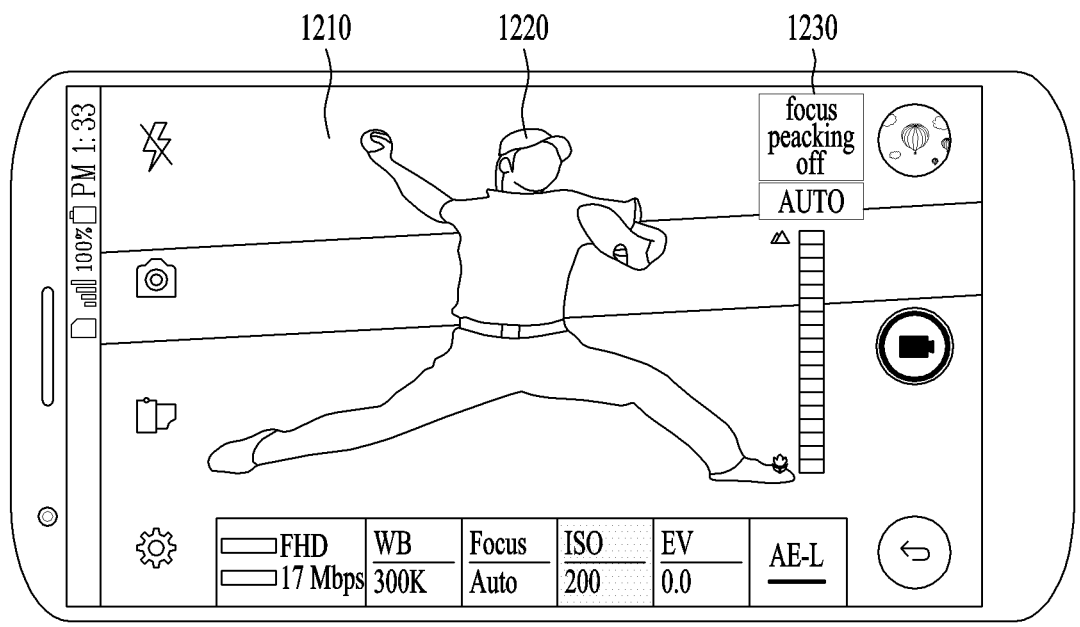
FIG. 12 illustrates an example of outputting a focus peaking indicator according to one embodiment of the present disclosure.
Figure 12:
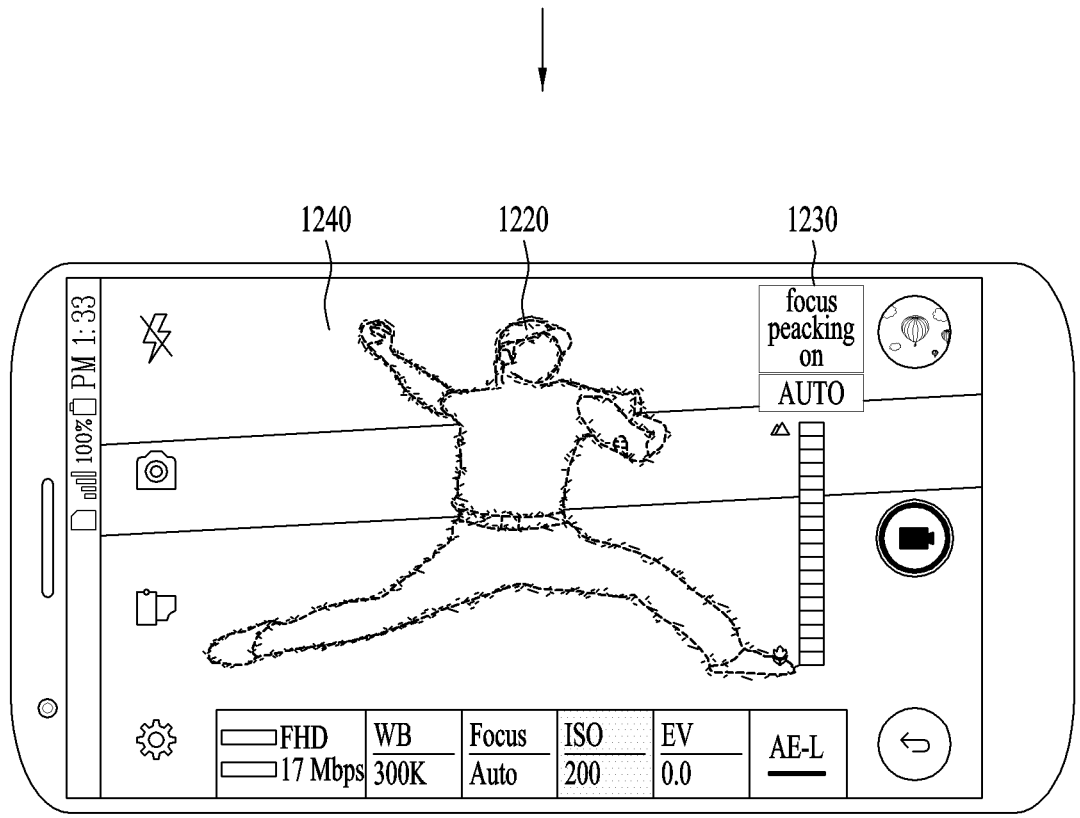

FIG. 12 illustrates an example of outputting the focus peaking indicator according to one embodiment of the present disclosure. Hereinafter, in the description of FIG. 12, the description overlapping with those FIG. 4 to FIG. 11 is omitted.

Referring to a first drawing of FIG. 12, the mobile terminal may output a preview image 1210 which is photographed by a camera on the display while the camera content is being executed. In this connection, the preview image 1210 may include a first object 1220. In one embodiment of the present disclosure, the mobile terminal may control the camera to focus on the first object 1220 included on the preview image 1210, while the manual focus function is activated.

Referring to a second diagram of FIG. 12, when the focus peaking focus function is activated by the camera content, the mobile terminal outputs the focus peaking indicator 1240 on the focused first object 1210. In this connection, the focus peaking function refers to a camera function by which the focus peaking indicator (for example, color) is used on the preview image to allow a focused region to be distinguished. Further, when the mobile terminal captures the preview image or takes a moving picture while the focus peaking indicator 1240 is being output, the focus peaking indicator 1240 may not appear the captured or imaged result.

Further, an embodiment for adjusting a thickness of the focus peaking indicator 1240 is described in detail in FIG. 13 below.

Accordingly, when the shooting environment is too bright or too dark to find a focused region using naked eyes, the user may check a focused object using the focus peaking function.

Figure 13:
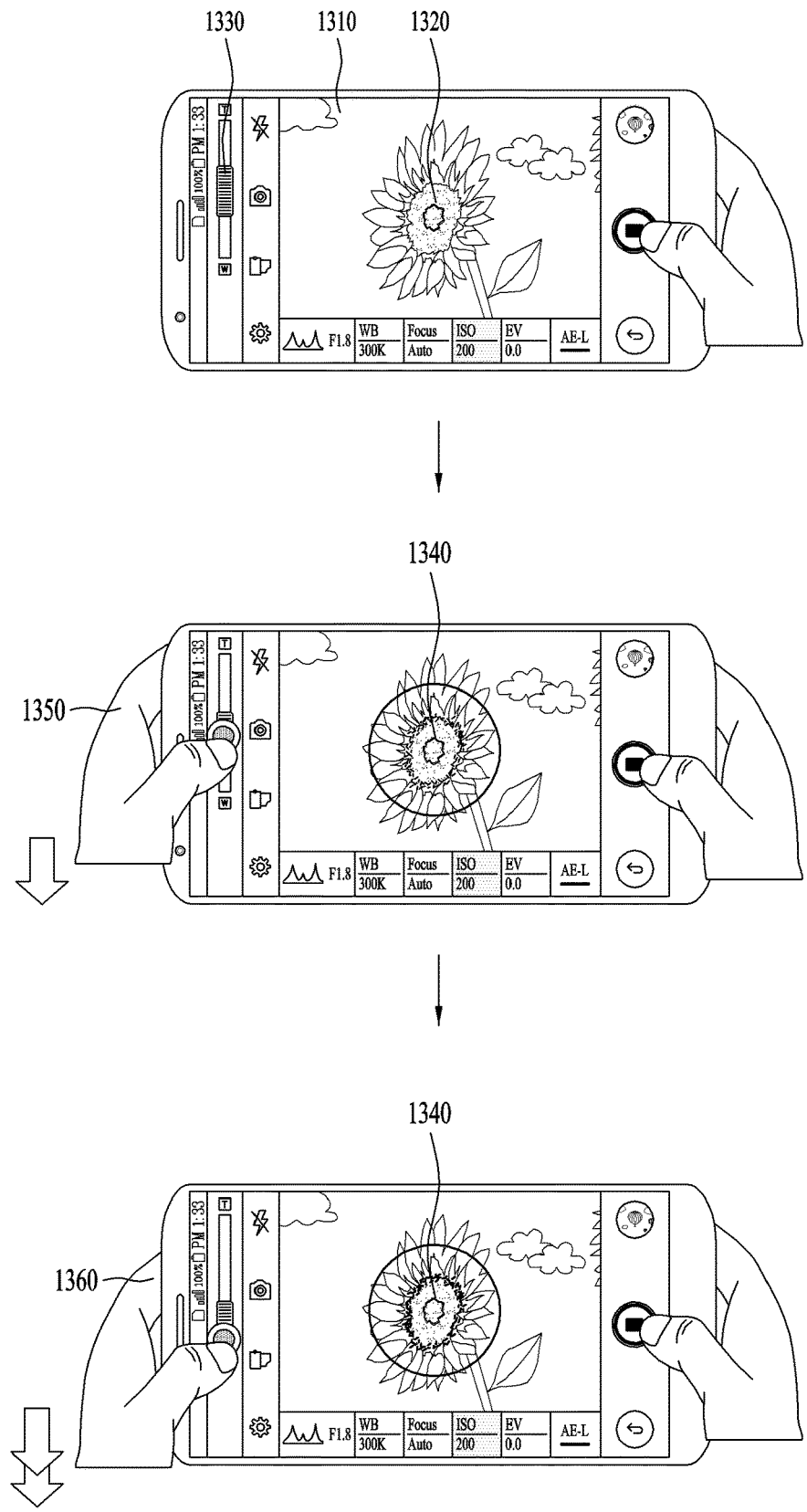
FIG. 13 is an illustration of an example of adjusting a thickness of the focus peaking indicator according to one embodiment of the present disclosure.

FIG. 13 is an illustration of an example of adjusting the thickness of the focus peaking indicator according to one embodiment of the present disclosure. Hereinafter, in the description of FIG. 13 the overlapping descriptions with those in FIG. 4 to FIG. 12 will be omitted.

Referring to a first drawing of FIG. 13, the mobile terminal may output a preview image 1310 which is photographed by a camera on the display while the camera content is being executed. In this connection, the preview image 1310 may include a first object 1320. Further, the mobile terminal may output a control icon 1330 on the camera content.

In one embodiment of the present disclosure, the mobile terminal may control the camera to focus on the first object 1320 included on the preview image 1310, while the manual focus function is activated. Further, when the focus peaking function of the camera content is activated, the focus peaking indicator 1340 may be output on the focused first object 1320. Further, although not shown in the drawing, the mobile terminal may simultaneously sense a first input signal 1350 that controls the control icon 1330 and an input signal that controls the manual focus.

Referring to a second drawing of FIG. 13, the mobile terminal may sense the first input signal 1350 scrolling the control icon 1330 in the first direction. In one embodiment of the present disclosure, when the mobile terminal senses the first input signal 1350, a thickness of the output focus peaking indicator 1340 may be adjusted to be smaller.

Referring to a third drawing of FIG. 13, the mobile terminal may sense a second input signal 1360 scrolling the control icon 1330 in the second direction. In one embodiment of the present disclosure, when the mobile terminal senses the second input signal 1360, the output focus peaking indicator 1340 may be thickened.

In one embodiment of the present disclosure, the second direction may correspond to the same as or opposite direction to the first direction.

More specifically, when the second direction is the same direction as the first direction, as shown in FIG. 13, the second input signal 1360 may correspond to an input signal indicating scrolling of farther the control icon than the first input signal 1350 scrolls the control icon. That is, when the input signals to be sensed have the same direction, the longer the scrolling distance of the input signal being sensed, the thicker the focus peaking indicator 1340 may be.

On the other hand, although not shown in the figure, when the second direction is opposite to the first direction, and when the first input signal 1350 is sensed, the output focus peaking indicator 1340 may be thickened. To the contrary, when the second input signal 1360 is sensed, the output focus peaking indicator 1340 may be adjusted to be thin.

Accordingly, the user can easily find out the focused object by adjusting the thickness of the focus peaking indicator 1340 according to the photographing environment by using the control icon 1330.

Figure 14:
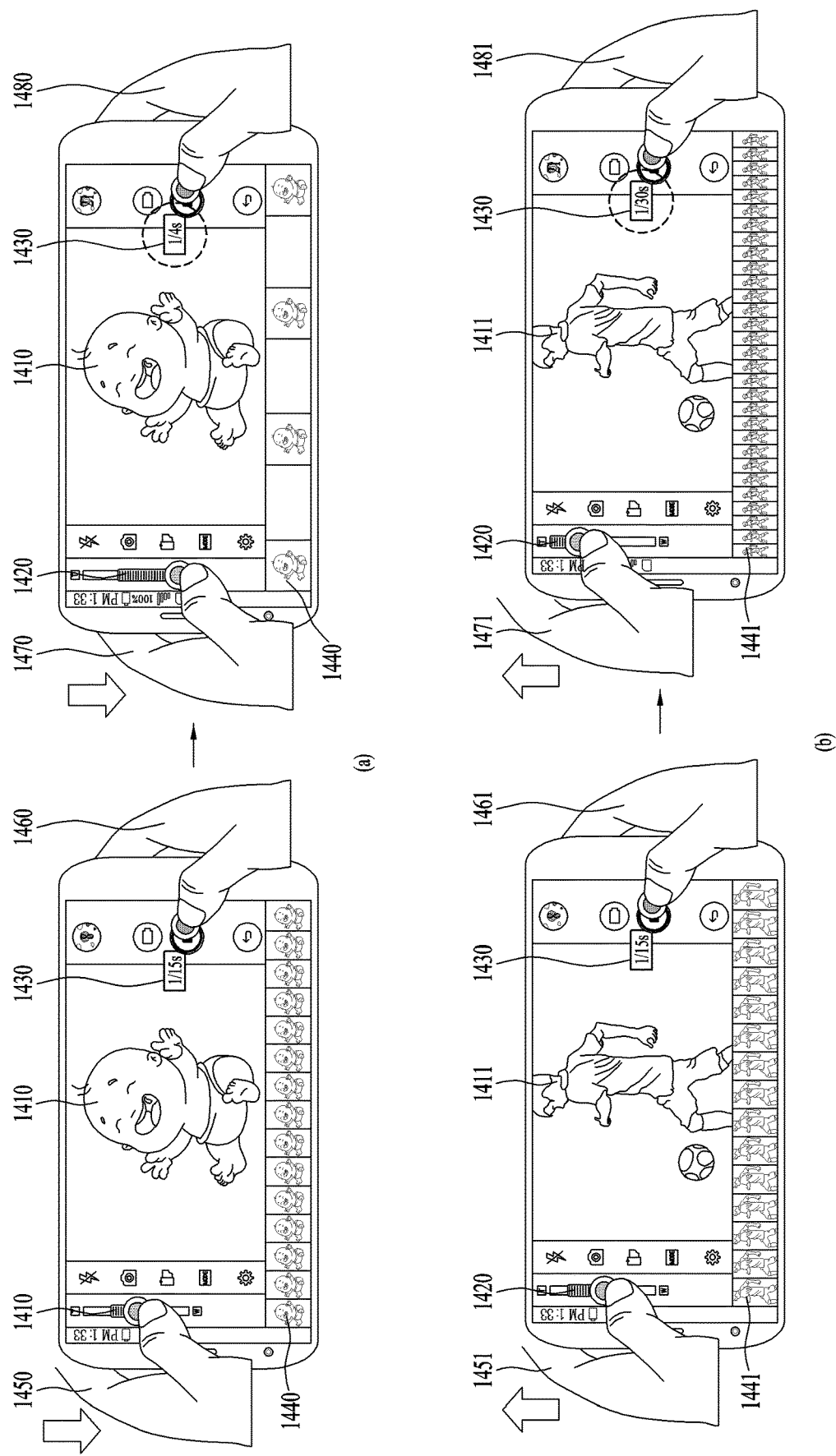
FIG. 14 is an illustration of an example of changing the number of image frames taken during a preconfigured time according to one embodiment of the present disclosure.

FIG. 14 is an example of changing the number of image frames taken for a pre-set time according to one embodiment of the present disclosure. Hereinafter, in the description of FIG. 14, the overlapping description with those FIG. 4 to FIG. 13 will be omitted.

Referring to a first drawing of FIG. 14, the mobile terminal may output a preview image including a first object 1410 on the display while the camera content is being executed. Further, the mobile terminal may output a control icon 1420 on the camera content.

In one embodiment of the present disclosure, the mobile terminal may control the camera to output an indicator 1430 on the camera content indicative of the number of image frames taken by the camera for the pre-set time. For example, when a continuous shooting function is activated, the mobile terminal may output an indicator 1430 indicating that 15 shots are taken for one second.

In one embodiment of the present disclosure, the mobile terminal may output thumbnails 1440 of the image frames that the camera captures for the pre-set time on a pre-set region of the camera content. For example, the mobile terminal may output 15 thumbnails 1440, which are shot for one second, onto a bottom of the camera content.

In one embodiment of the present disclosure, when the mobile terminal senses a first input signal 1450 indicating scrolling of the control icon 1420 in the first direction, e.g., in a downward direction while a burst shot function of the camera content is activated, the terminal may control the camera to reduce the number of image frames taken for the pre-set time.

In one embodiment of the present disclosure, the mobile terminal may sense a first input signal 1450, while sensing a second input signal 1460 indicating capturing the preview image. In this connection, the second input signal 1460 may correspond to a long press touch input that activates the continuous shooting function. For example, the user may scroll the control icon 1420 while pressing a photographing icon hard to continuously photograph the preview image. Hereinafter, in an embodiment of FIG. 14(*a*), it is assumed that a speed of the first object 1410 is lower than a pre-set speed.

Referring to a second drawing of FIG. 14(*a*), when a detected speed of the first object 1410 is lower than the pre-set speed, the mobile terminal may change the length of the control icon 1420 to be larger than the first length based on the speed of the first object 1410. Accordingly, when the length of the control icon 1420 becomes larger, the number of levels at which the control icon 1420 may be scrolled becomes decreased, such that the number of levels at which the mobile terminal may change the number of image frames taken during the pre-set time increases.

In one embodiment of the present disclosure, when the mobile terminal senses a third input signal 1470 indicating scrolling of the extended control icon 1420 in the first direction, the mobile terminal may control the camera to increase the number of image frames that the camera takes for the pre-set time.

For example, as the mobile terminal senses the third input signal 1470, the terminal may change the number of image frames taken for one second to four. Accordingly, when the continuous shooting function is activated, the indicator 1430 indicating that four shots are taken for one second may be displayed. Thus, four thumbnails 1440 taken for one second may be displayed on the bottom of the camera content.

In one embodiment of the present disclosure, after the number of image frames captured for the pre-set time is determined in the above embodiment, the mobile terminal may sense a fourth input signal 1480, and control the camera to perform a continuous shooting function. In this connection, the fourth input signal 1480 may correspond to a touch input that presses a imaging icon harder to take a series of preview images.

Referring to a first view of FIG. 14(*a*), the mobile terminal may output a preview image that includes a second object 1411 on the display while the camera content is being executed. Further, the mobile terminal may output a control icon 1420 on the camera content.

In one embodiment of the present disclosure, the mobile terminal may control the camera to output an indicator 1430 on the camera content indicative of the number of image frames taken by the camera for the pre-set time.

In one embodiment of the present disclosure, the mobile terminal may output, on a pre-set region of the camera content, thumbnails 1441 of image frames of the second object 1411 that the camera is photographing for the pre-set time.

In one embodiment of the present disclosure, when the mobile terminal senses a fifth input signal 1451 indicating scrolling of the control icon 1420 in a second direction, e.g., in the upward direction while the burst shot function or continuous shooting of the camera content is activated, the terminal may control the camera to increase the number of image frames taken for the pre-set time.

In one embodiment of the present disclosure, the mobile terminal may sense a fifth input signal 1451 while sensing a sixth input signal 1461 indicating capturing of the preview image.

Hereinafter, in description of FIG. 14(*b*), it is assumed that a moving speed of the second object 1411 is higher than a pre-set speed.

Referring to a second drawing of FIG. 14(*b*), when the detected speed of the second object 1411 is higher than the pre-set speed, the length of the control icon 1420 may be changed to be smaller than the first length based on the speed of the second object 1411. Accordingly, when the length of the control icon 1420 is smaller, the number of levels at which the control icon 1420 may be scrolled becomes increased, and, thus, the number of levels at which the mobile terminal may change the number of image frames taken for the pre-set time increases.

In one embodiment of the present disclosure, when the mobile terminal may sense a seventh input signal 1471 indicating scrolling of the shortened control icon 1420 in the second direction, the terminal may control the camera to increase the number of image frames taken for the pre-set time.

For example, as the mobile terminal senses the seventh input signal 1471, the terminal may change the number of image frames photographed for one second to 30 frames. Accordingly, when the continuous shooting function is activated, the terminal may output the indicator 1430 indicating that 30 shots are taken for one second. Further, 30 thumbnails 1441 taken for 1 second may be displayed on the bottom of the camera content.

In one embodiment of the present disclosure, after the number of image frames photographed for the pre-set time is determined in the above embodiment, and when an eighth input signal 1481 is sensed, the terminal may control the camera to perform the continuous shooting function.

The embodiments of FIGS. 9 to 11 above may be applied to the embodiment of FIG. 14. Accordingly, the mobile terminal may subdivide the scrolled pre-set region based on the length of the control icon 1420. The number of image frames captured by the camera for the pre-set time can be adjusted correspondingly.

Figure 15:
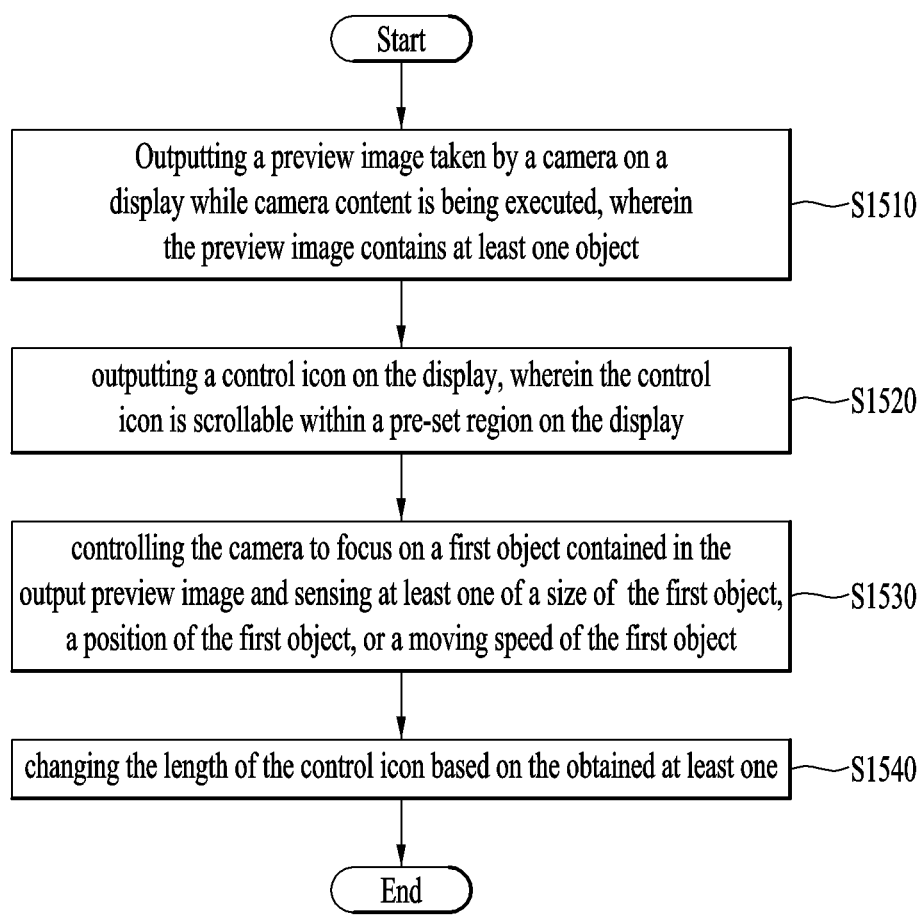
FIG. 15 is a flow diagram illustrating an example of changing a length of a control icon based on a sensed condition according to one embodiment of the present disclosure.

FIG. 15 is a flow diagram describing an embodiment of changing a length of a control icon based on a sensed condition according to one embodiment of the present disclosure. Operations of FIG. 15 as described below may be controlled by the controller in FIG. 1*a*.

At operation S1510, the mobile terminal may output a preview image of an image frame shot through the camera on the display while the camera content is being executed. In this connection, the preview image may include at least one object.

At operation S1520, the mobile terminal may output a control icon on the camera content. In this connection, the control icon may be scrolled within the pre-set region on the camera content. For example, a pre-set region may be defined as a scrollbar region on one side region of the camera content.

At operation S1530, when the camera focuses on the first object included in the preview image, the mobile terminal may detect at least one condition among the size, output location and speed of the first object.

At operation S1540, the mobile terminal may change the length of the control icon based on the sensed condition. Assuming that the length of the control icon is a first length, the mobile terminal may subdivide the scrolled pre-set region by the control icon into N sub-regions.

In one embodiment of the present disclosure, when the length of the control icon is changed to be larger than the first length, the mobile terminal may subdivide the scrolled pre-set region into sub-regions M smaller than N. Further, when the length of the control icon is changed to be smaller than the first length, the mobile terminal may subdivide the scrolled pre-set region into sub-regions Z greater than N.

Accordingly, the number of levels at which the scrolled per-set region is scrolled varies according to the length of the control icon. Thus, the mobile terminal may control the focused region indicator, the focus assisting region, and the burst shot based on the length of the control icon. That is, it is needless to say that the embodiments as described above with reference to FIGS. 5 to 14 may be implemented as the control method of the mobile terminal as shown in FIG. 15.

The abovementioned present disclosure may be implemented using computer readable codes on a medium on which a program is recorded, the computer readable medium includes any type of recording device that stores data that may be read by a computer system. Examples of the medium that can be read by a computer include HDD (Hard Disk Drive), SSD (Solid State Disk), SDD (Silicon Disk Drive), ROM, RAM, CD-ROM, magnetic tape, floppy disk, optical data storage device, etc. Further, the medium may include a carrier wave (for example, transmission over the Internet). Further, the computer may include a controller 180 of the mobile terminal. Accordingly, the above detailed description is to be considered in all respects as illustrative and not restrictive. The scope of the present disclosure shall be determined by a rational interpretation of the appended claims. All changes within the equivalent range of the present disclosure are included in the scope of the present disclosure.

INDUSTRIAL APPLICABILITY

The present invention has industrial applicability to the mobile terminal and thus is applicable repeatedly.

The invention claimed is:

1. A mobile terminal comprising:
a camera;
a sensing unit;
a display; and
a controller configured to:
output a preview image taken by the camera on the display while camera content is being executed, wherein the preview image contains at least one object;
output a control icon scrollable within a pre-set region on the display, wherein a length of the control icon is a first length;
control the camera to focus on a first object contained in the output preview image;
obtain at least one of a size of the first object, a position of the first object, and a moving speed of the first object using the sensing unit; and
change the length of the control icon based on the obtained at least one of the size of the first object, the position of the first object, and the moving speed of the first object,
wherein the controller is further configured to:
obtain a first input signal indicating scrolling of the control icon from a first point to a second point of the pre-set region using the sensing unit; and
control the camera to zoom-in or zoom-out the taken preview image at a first speed in response to the first input signal, wherein the first speed is determined based on a distance from the first point to the second point.

2. The mobile terminal of claim 1, wherein the controller is further configured to:
when the length of the control icon changes to be larger than the first length, configure the control icon to scroll the pre-set region at a N-levels manner; and
when the length of the control icon changes to be smaller than the first length, configure the control icon to scroll the pre-set region at a M-levels manner, wherein M is greater than N.

3. The mobile terminal of claim 1, wherein when the first input signal is maintained for a first time at the second point, the controller is further configured to control the camera to zoom-in or zoom-out the preview image for the first time.

4. The mobile terminal of claim 1, wherein when the first input signal is removed from the second point, the controller is further configured to move the control icon to the first point, wherein the first point is a middle point of the pre-set region, and
wherein when the controller obtains a second input signal using the sensing unit, the controller is further configured to control the camera to capture the zoomed-in or zoomed-out preview image.

5. The mobile terminal of claim 1, wherein when the camera focuses on the first object, the controller is further configured to control the camera to output a focused region indicator on the camera content.

6. The mobile terminal of claim 5, wherein the controller is further configured to:
when the size of the first object is larger than a pre-set size, change the length of the control icon to be larger than the first length based on the size of the first object; and
when the size of the first object is smaller than a pre-set size, change the length of the control icon to be smaller than the first length based on the size of the first object.

7. The mobile terminal of claim 5, wherein the controller is further configured to:
when a third input signal indicating scrolling of the control icon in a first direction is sensed by the sensing unit, control the camera to increase a size of the focused region indicator; and
when a fourth input signal indicating scrolling of the control icon in a second direction is sensed by the sensing unit, control the camera to decrease the size of the focused region indicator, wherein the first and second directions are opposite to each other.

8. The mobile terminal of claim 1, wherein when a focus assisting function is activated by the camera content, the controller is further configured to overlay a focus assisting region on the preview image,
wherein the focus assisting region contains the first object, and
wherein a size of the focus assisting region is determined based on the size of the first object.

9. The mobile terminal of claim 8, wherein the controller is further configured to:
when the size of the focus assisting region is larger than a pre-set size, change the length of the control icon to be larger than the first length based on the size of the focus assisting region; and
when the size of the focus assisting region is smaller than a pre-set size, change the length of the control icon to be smaller than the first length based on the size of the focus assisting region.

10. The mobile terminal of claim 8, wherein the controller is further configured to control the camera content to output the focus assisting region to non-overlap with the first object on the preview image.

11. The mobile terminal of claim 1, wherein when a focus peaking function is activated by the camera content, the controller is further configured to control the camera to output a focus peaking indicator on the first object.

12. The mobile terminal of claim 11, wherein the controller is further configured to:
when sensing a fifth input signal indicting scrolling of the control icon in a third direction using the sensing unit, adjust a thickness or the focus peaking indicator to be larger; and
when sensing a sixth input signal indicting scrolling of the control icon in a fourth direction using the sensing unit, adjust a thickness or the focus peaking indicator to be smaller.

13. The mobile terminal of claim 12, wherein the fourth direction is the same as or opposite to the third direction.

14. The mobile terminal of claim 13, wherein when the fourth direction is the same direction as the third direction, the sixth input signal indicates that the control icon is scrolled by a shorter distance than a scrolled distance indicated by the fifth input signal.

15. The mobile terminal of claim 1, wherein the controller is further configured to:
when the obtained speed of the first object is higher than a pre-set speed, change a length of the control icon to be smaller than the first length based on the speed of the first object; and
when the obtained speed of the first object is lower than a pre-set speed, change a length of the control icon to be larger than the first length based on the speed of the first object.

16. The mobile terminal of claim 15, wherein the controller is further configured to:
when sensing a seventh input signal indicating scrolling of the control icon in a fifth direction using the sensing unit while a burst shot function of the camera content is activated, control the camera to increase a number of image frames taken for a pre-set time by the camera; and
when sensing an eighth input signal indicating scrolling of the control icon in a sixth direction using the sensing unit while the burst shot function of the camera content is activated, control the camera to decrease a number of image frames taken for the pre-set time by the camera.

17. The mobile terminal of claim 16, wherein the controller is further configured to control the camera to output, on the camera content, an indicator indicative of the number of image frames taken for the pre-set time.

18. The mobile terminal of claim 1, wherein when the first object moves, the controller is further configured to control the camera to move a focus thereof based on the moving first object.

19. A method for controlling a mobile terminal, the method comprising:
outputting a preview image taken by a camera on a display while camera content is being executed, wherein the preview image contains at least one object;
outputting a control icon scrollable within a pre-set region on the display, wherein a length of the control icon is a first length;
controlling the camera to focus on a first object contained in the output preview image;

obtaining at least one of a size of the first object, a position of the first object, and a moving speed of the first object; and changing the length of the control icon based on the obtained at least one of the size of the first object, the position of the first object, and the moving speed of the first object, wherein the method further comprises:

obtaining a first input signal indicating scrolling of the control icon from a first point to a second point of the pre-set region using the sensing unit; and controlling the camera to zoom-in or zoom-out the taken preview image at a first speed in response to the first input signal, wherein the first speed is determined based on a distance from the first point to the second point.

* * * * *